United States Patent [19]

Rikuna et al.

[11] Patent Number: 4,749,982

[45] Date of Patent: Jun. 7, 1988

[54] INTELLIGENT CARD

[75] Inventors: Kenji Rikuna; Harumi Nakano; Kazuya Hara; Yoshimi Shigenaga; Hiroyasu Bito, all of Tokyo; Eiichi Takeuchi, Iruma; Morito Tamiya, Tokyo, all of Japan

[73] Assignee: Casio Computer Co., Ltd., Tokyo, Japan

[21] Appl. No.: 746,200

[22] Filed: Jun. 18, 1985

[30] Foreign Application Priority Data

Jun. 19, 1984 [JP] Japan ................. 59-125754
Jul. 4, 1984 [JP] Japan ................. 59-138250
Jul. 6, 1984 [JP] Japan ................. 59-140006
Sep. 7, 1984 [JP] Japan ................. 59-135698[U]

[51] Int. Cl.⁴ .......................... G06K 5/00; G06F 7/02
[52] U.S. Cl. ................. 340/146.2; 235/380
[58] Field of Search ............ 340/146.2, 825.33; 235/380

[56] References Cited

U.S. PATENT DOCUMENTS

| | | | |
|---|---|---|---|
| 3,971,916 | 7/1976 | Moreno | 364/200 |
| 4,007,443 | 2/1977 | Bromberg et al. | 364/709 X |
| 4,042,777 | 8/1977 | Bequaert | 364/709 |
| 4,105,156 | 8/1978 | Dethloff | 235/441 |
| 4,158,230 | 6/1979 | Washizuka et al. | 364/708 |
| 4,264,962 | 4/1981 | Kodaira | 364/707 |
| 4,267,578 | 5/1981 | Yetter | 364/709 |
| 4,379,640 | 4/1983 | Inoue | 364/710 X |
| 4,408,119 | 10/1983 | Decavele | 235/380 |
| 4,442,345 | 4/1984 | Mollier et al. | 235/380 |
| 4,449,040 | 5/1984 | Matsuoka et al. | 235/380 |
| 4,453,074 | 6/1984 | Weinstein | 235/380 |
| 4,484,067 | 11/1984 | Obrecht | 235/380 |
| 4,529,870 | 7/1985 | Chaum | 235/380 |
| 4,614,861 | 9/1986 | Pavlov et al. | 235/380 |
| 4,634,845 | 1/1987 | Hale et al. | 235/380 |

Primary Examiner—David H. Malzahn
Attorney, Agent, or Firm—Frishauf, Holtz, Goodman & Woodward

[57] ABSTRACT

In an intelligent card, a keyboard has numeric keys for entering identification information and a collation execution key. A solar cell, a display device and an IC chip for performing arithmetic operations and card identification are incorporated in a case. The IC chip includes a nonvolatile memory for storing predetermined identification information. The predetermined identification information is compared with the input identification information entered at the keyboard upon operation of the key, thereby performing card identification.

23 Claims, 23 Drawing Sheets

F I G. 7
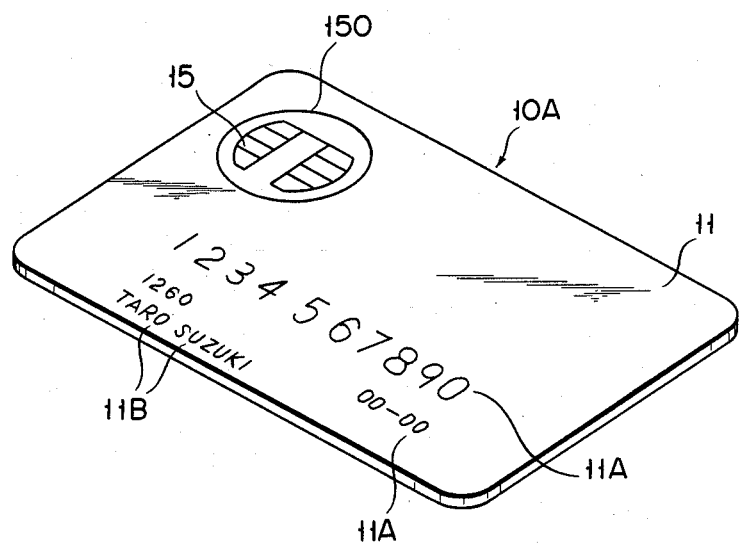
F I G. 9
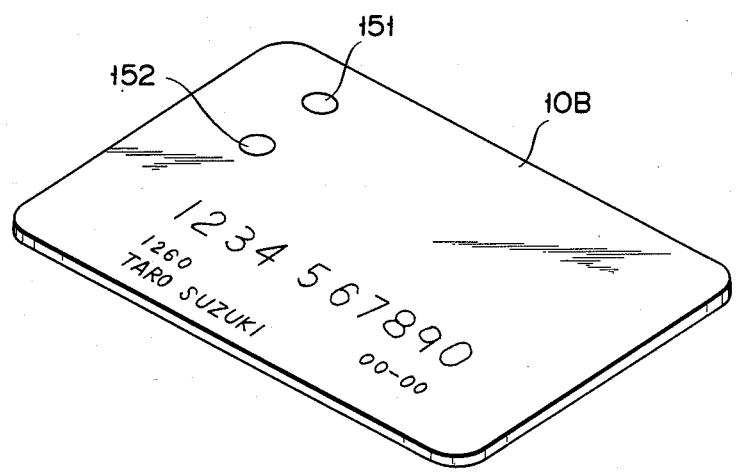

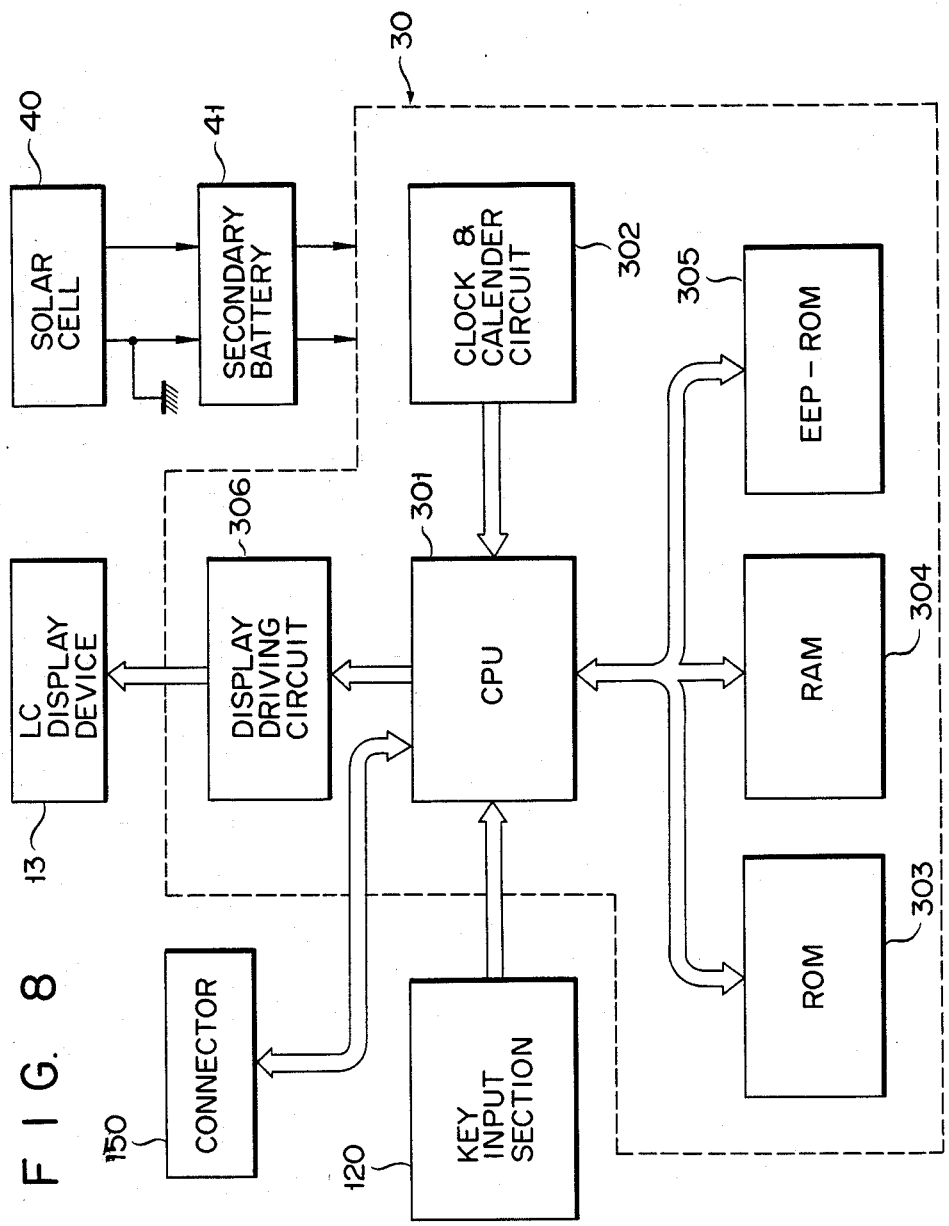
F I G. 8

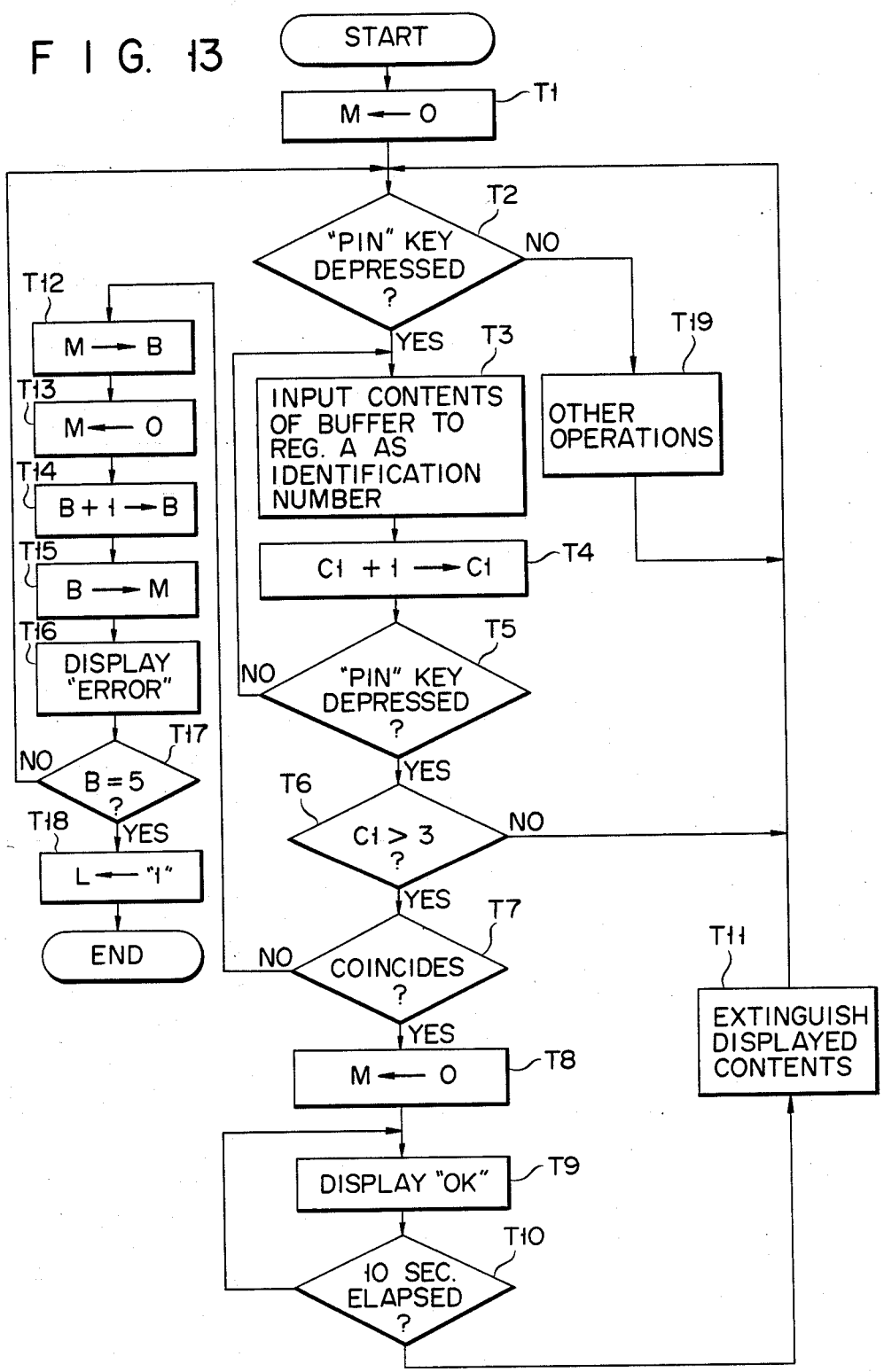

FIG. 19

F I G. 27
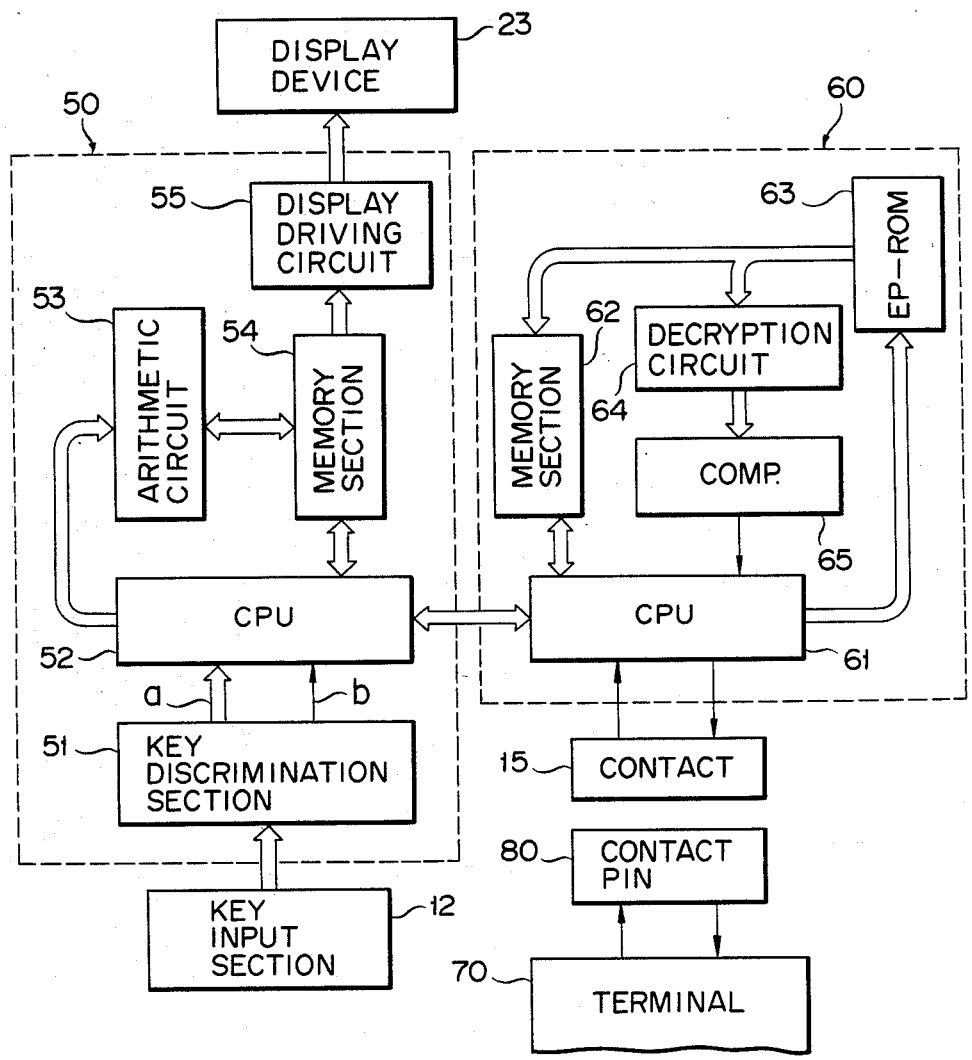

INTELLIGENT CARD

BACKGROUND OF THE INVENTION

The present invention relates to an intelligent card which can identify the authenticity of its holder.

In so-called cash and credit cards, embossed characters and a magnetic recording coating are formed on the surface of a plastic plate. However, since these conventional cards have a poor identification capability for determining whether or not a user is valid, they can be used by people other than the authorized card holders. For this reason, a card (i.e., an IC card) having a higher identification capability has been developed and used in practice. An IC chip is embedded in the IC card to effectively prevent people other than the authorized card holder from using the card or counterfeiting it. A connecting terminal is arranged on the surface or edge of the IC card. When the IC card is set in a terminal device installed at, for example, a bank, the IC chip in the IC card is electrically connected to the terminal device through the connecting terminal. The IC chip is energized from the terminal device through the connecting terminal, and an identification number is entered at the keyboard in the terminal device. The identification number prestored in the IC chip is read out and compared with the entered identification number in the terminal device so as to determine whether or not the current card user corresponds to the authorized card holder.

However, in a conventional IC card, the IC chip is simply embedded in the card body, so that the terminal device must be used to identify the card user. Terminal device costs are relatively high and impose a load on a retail store with a relatively small capital. In addition to this disadvantage, the card holder must enter the identification number in the presence of a store clerk, so that secrecy of the identification number cannot be guaranteed.

SUMMARY OF THE INVENTION

It is an object of the present invention to provide an intelligent card which can identify a card holder and can prevent use of the card by people other than the authorized card holder and prevent counterfeiting of the card.

According to the present invention, there is provided an intelligent card comprising: input means for entering identification information; first memory means for storing the identification information entered by the input means; second memory means for storing predetermined identification information; means for performing a collation of the identification information stored in the first and second memory means; and means for generating a signal representing a collation result generated from the collation performing means.

BRIEF DESCRIPTION OF THE DRAWINGS

FIG. 7 is a perspective view showing the outer appearance of an intelligent card according to a third embodiment of the present invention;

FIG. 8 is a block diagram of the circuit of the intelligent card shown in FIG. 7;

FIG. 9 is a perspective view of an intelligent card according to a fourth embodiment of the present invention;

FIGS. 12 and 13 are respectively flow charts for explaining the operation of the intelligent card of FIG. 11;

FIG. 19 is a block diagram of the circuit of the intelligent card shown in FIGS. 18A to 18C;

FIG. 27 is a block diagram of the circuit of the intelligent card shown in FIG. 22.

DETAILED DESCRIPTION OF THE PREFERRED EMBODIMENTS

Figure 1A:
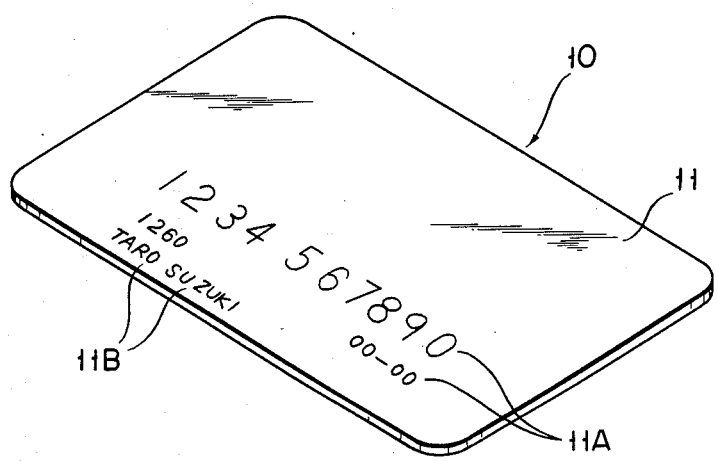
FIGS. 1A and 1B are perspective views showing the upper and lower surfaces of an intelligent card according to a first embodiment of the present invention, respectively.
Figure 1B:
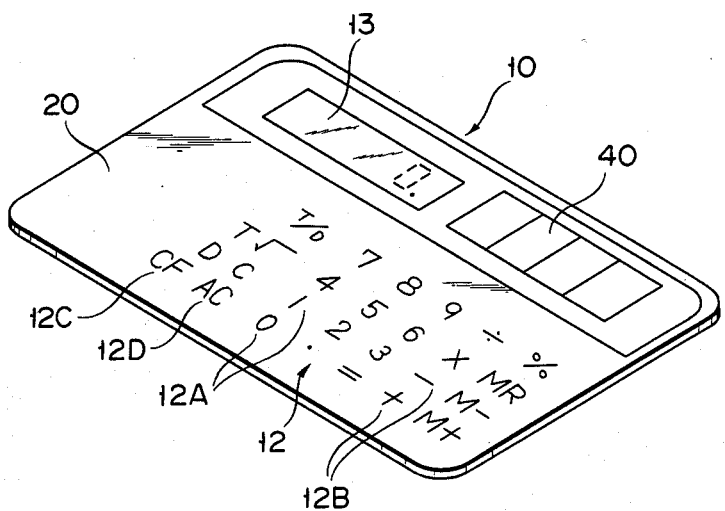

FIGS. 1A and 1B are respectively perspective views showing the upper and lower surfaces of an intelligent card which adapts the present invention. Reference numeral 10 denotes a card body. Characters are embossed in an uppermost sheet 11 to represent an identification code 11A, a card holder name 11B and the like. A receipt can be issued by an emboss-in-printer or the like after the card as shown in FIG. 1A is set in the printer.

A keyboard 12, an LC (liquid crystal) display device 13 and a solar cell 40 are mounted on a lowermost sheet 20, and an LSI (to be described later) is incorporated in the card body 10 to constitute a compact electronic calculator.

A collation function key (i.e., a CF key) 12C is arranged in the keyboard 12 to enter an identification number, in addition to numeric keys 12A and function keys 12B.

The intelligent card has substantially the same thickness as that (0.8 mm) of a cash card and a size complying with ISO standards. The intelligent card has both cash card and calculator functions.

The internal structure of the body 10 will be described later.

Figure 2:
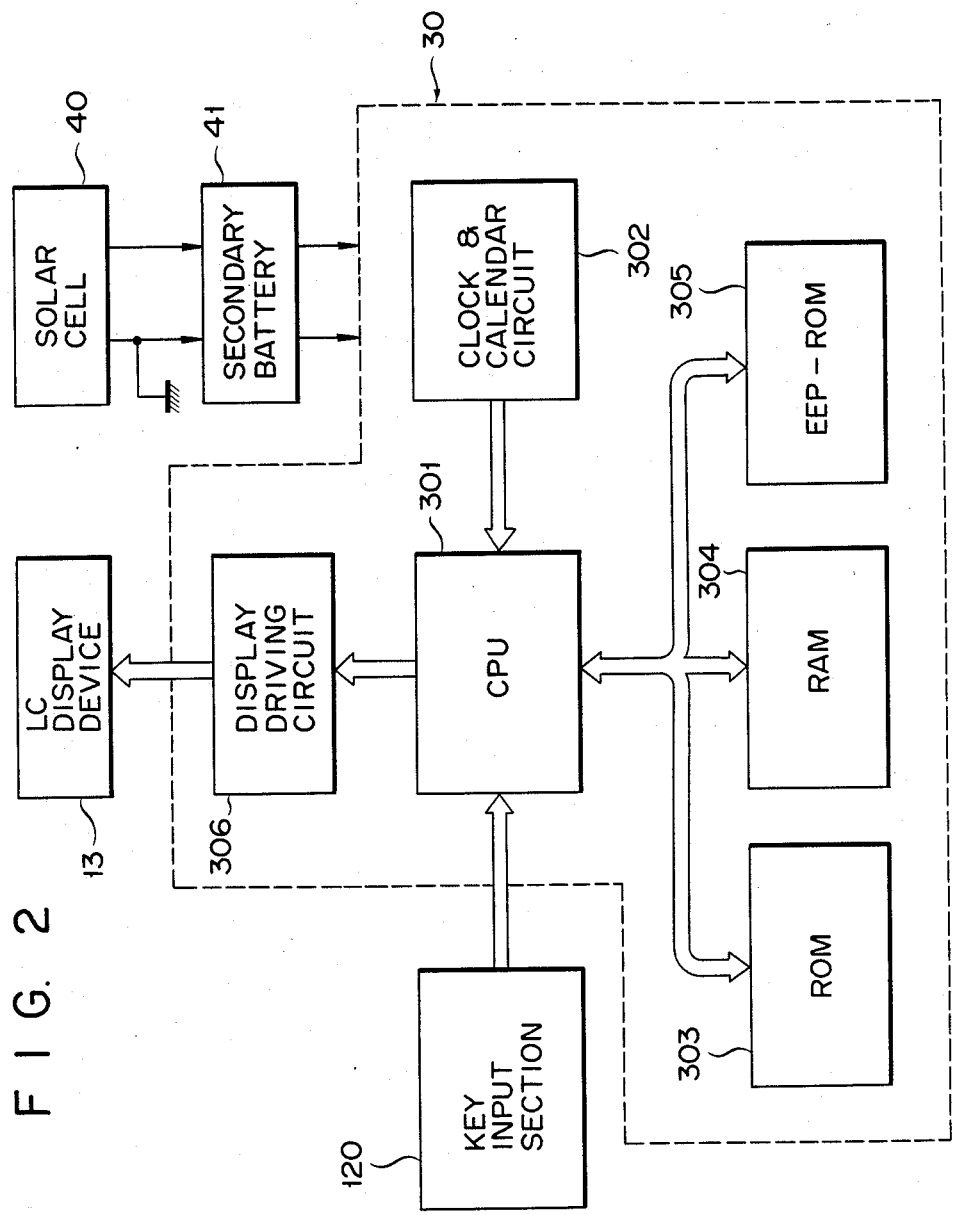
FIG. 2 is a block diagram of a circuit of the intelligent card shown in FIGS. 1A and 1B.

FIG. 2 is a block diagram of the circuit of the intelligent card described above. Reference numeral 120 denotes a key input section including the keyboard 12. The section 120 supplies a key input signal to a CPU (Central Processing Unit) 301 in an LSI 30.

The CPU 301 is connected to a clock & calendar circuit 302, a ROM 303, a RAM 304, an EEP-ROM (Electronic Erasable Programable ROM) 305, and a display driving circuit 306, thereby constituting the LSI 30.

The ROM 303 stores microinstructions for executing various types of instructions. The RAM 304 has an arithmetic register and other temporary storage registers. Various types of operations such as arithmetic calculations are performed between the CPU 301 and the RAM 304 on the basis of control by the ROM 303.

An arithmetic result obtained by the arithmetic calculation described above and numeric data entered at the section 120 are converted by the display driving circuit 306 so that the converted data are displayed on the device 13.

The clock & calendar circuit 302 includes a quartz oscillator and a frequency divider and measures the current time. At the same time, the circuit 302 calculates year, month and day in accordance with a date change signal. Therefore, the specific year, month and day can be displayed on the device 13.

The EEP-ROM 305 is a ROM whose data can be changed upon application of a predetermined high voltage thereto. When data is written in the EEP-ROM 305, data can be held without a back-up battery in the same manner as in a static ROM.

For this reason, identification data representing an identification number or a membership number is prestored in the EEP-ROM 305. The identication number entered by the card user at the keyboard 12 is compared with the identification number prestored in the EEP-ROM 305 to determine whether or not the current card user corresponds to the authorized card holder. This comparison operation will be described in detail later.

The CPU 301, the circuit 302, the ROM 303, the RAM 304, the EEP-ROM 305 and the circuit 306 are integrated as the one-chip LSI 30.

The LSI 30 is energized by a secondary battery 41 which is powered by the solar cell 40.

Even during shielding of the cell 40 from external light or during nighttime, the battery 41 energizes the LSI 30, so that the LSI 30 will not fail to provide prescribed functions.

Figure 3:
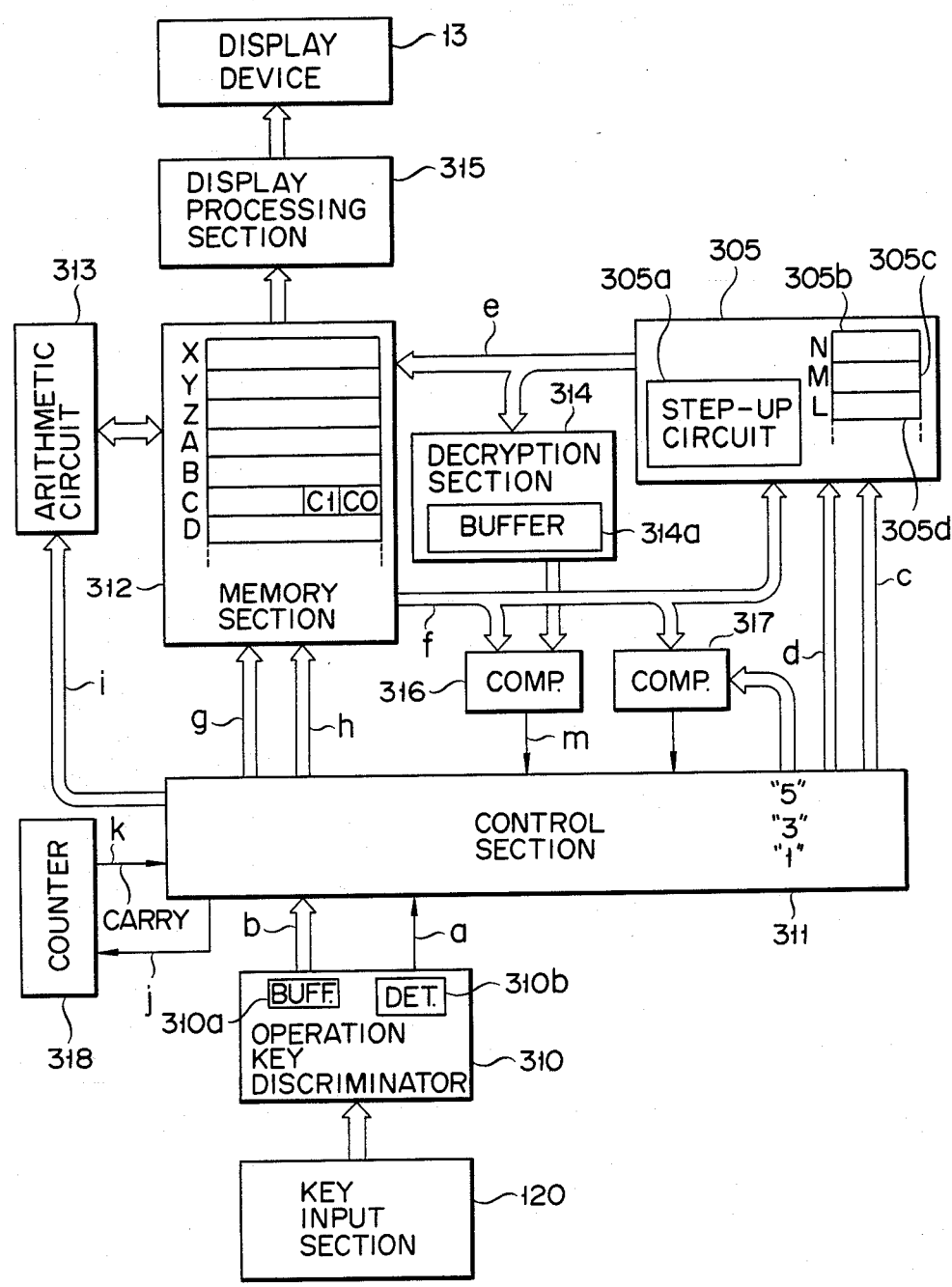
FIG. 3 is a diagram showing the function blocks of the circuit of FIG. 2.

In order to best understand the present invention, the function blocks of the LSI 30 of FIG. 2 are illustrated in FIG. 3. The same reference numerals in FIG. 3 denote the same parts as in FIG. 2.

An operation key discriminator 310 is connected to the section 120 to decode a key input signal entered at the section 120, thereby discriminating the depressed key. When the CF key 12C is depressed, the discriminator 310 generates an output signal from a line a. However, when another key such as the key 12A or 12B is depressed, the discriminator 310 supplies a corresponding output signal to a control section 311 through a bus line b.

The section 311 is connected to a memory section 312 of the RAM 304, an arithmetic circuit 313 and the EEP-ROM 305.

The EEP-ROM 305 comprises a step-up circuit 305a for boosting a supply voltage to a high voltage, 21 volts, in this case, to write data, an area N (305b) for storing a predetermined identification number, an area M (305c) for storing the number of times of noncoincidence as a result of comparison between the number entered at the keyboard 12 and the prestored identification number, and an area L (305d) for storing an invalid flag representing that the card is invalidated.

The identification number stored in the area N (305b) is stored in an encrypted form so as to prevent counterfeiting. The encrypted data is decrypted by a decryption section 314 to binary coded decimal data. The binary coded decimal data is temporarily stored in a buffer 314a. The encrypted identification number is decrypted by an encoder comprising the ROM 303. When the binary coded decimal data is coded by an RSA method and the like, the data is decrypted in accordance with an algorithm by using a prescribed decryption key.

The section 311 controls read/write access and addressing of the EEP-ROM 305 through bus lines c and d.

The memory section 312 comprises arithmetic registers consisting of X, Y and Z registers and a temporary storage register including A to D registers. The section 312 exchanges data with the EEP-ROM 305 through bus lines e and f. The section 312 receives register instructions from the section 311 and numeric data and code data (constant) through bus lines g and h.

In the section 312, the A register stores the numeric data (i.e., input identification number) entered at the section 120, the B register stores the number of times of noncoincidence as a result of comparison between the input identification number and the identification number stored in the area N (305b)of the EEP-ROM 305, and the C register stores a flag which is set upon invalidation of the card. The section 312 is connected to a display processing section 315, so that the display data stored in the section 312 is properly processed by the section 315 and is displayed on the device 13.

The arithmetic circuit 313 is connected to the sections 311 and 312 to perform various arithmetic calculations using the X, Y and Z registers. The circuit 313 also increments the content of the B register by one so as to update the number of times of noncoincidence between the input identification number and the stored identification number. These calculations are performed under the control of the section 311 through a bus line i.

Reference numerals 316 and 317 denote comparators, respectively. The comparator 316 compares the content of the buffer 314a with the content of the A register. The comparator 317 compares the content of the B register with the constant "5" supplied from the section 311 and checks whether or not the number of times of noncoincidence has reached "5". Comparison results from the comparators 316 and 317 are supplied to the section 311.

The section 311 is also connected to a counter 318. The counter 318 serves to display a 10-second display of "OK" when the input identification number is identical with the stored identification number. The counter 318 is started in response to a start signal supplied from the section 311 through a line j and generates a carry signal to the section 311 through a line k, so that the section 311 can determine that 10 seconds have elapsed.

The operation of the intelligent card according to this embodiment will be described with reference to FIGS. 4 and 5.

Figure 4:
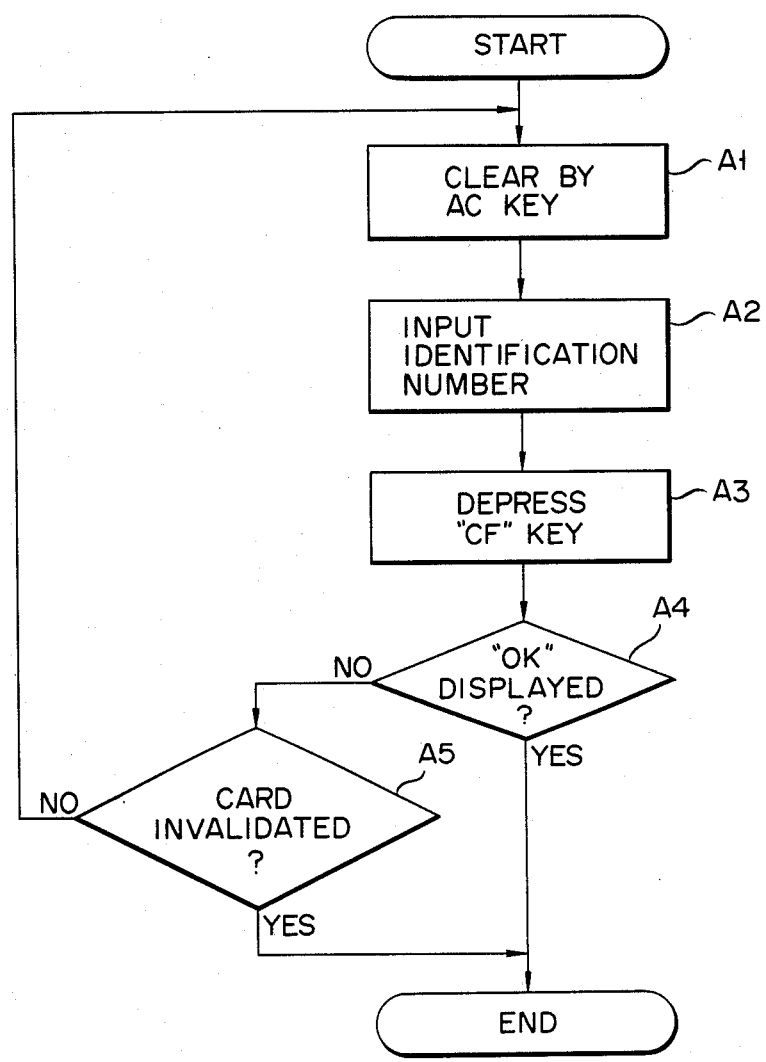
FIG. 4 is a flow chart for explaining the operation associated with the user.
Figure 5:
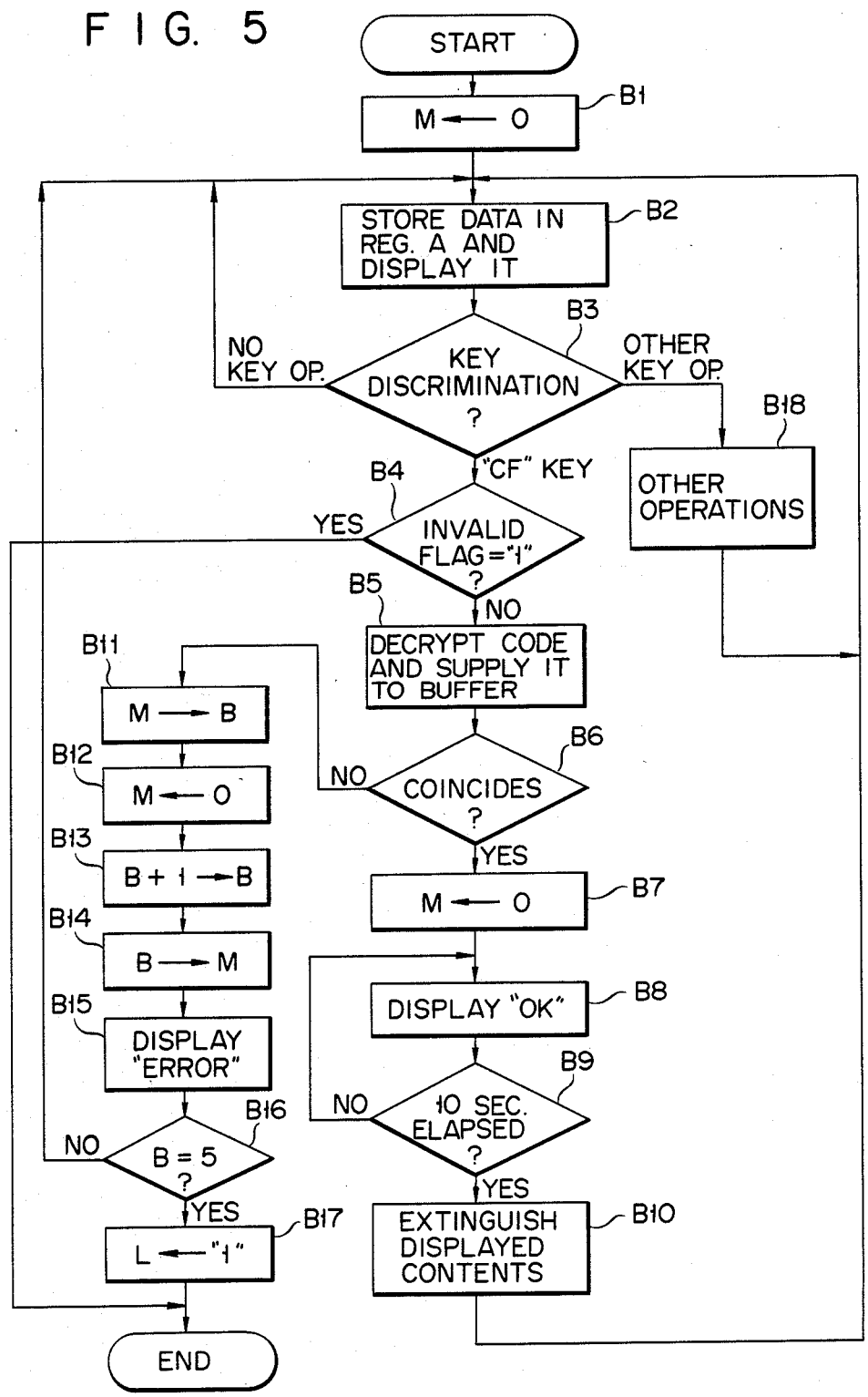
FIG. 5 is a flow chart for explaining the operation of the intelligent card.

FIG. 4 shows an operation of a card user when the input identification number is to be collated with the stored identification number. Assume that the card user uses the intelligent card as a credit card at a store, instead of paying cash when he purchases an item. The user depresses an AC key (i.e., all clear key) 12D in the keyboard 12 to clear the display (step A1). The user then enters an identification number by using the keys 12A on the keyboard 12 (step A2). This key input operation must be performed without being observed by a store clerk.

When the user completely enters the identification number, the input number is displayed. The collation function key (CF key) 12C is depressed to clear the number displayed on the screen (step A3). The input identification number is compared by an internal circuit of the LSI 30 with the stored identification number. When a coincidence between these identication numbers is established, "OK" is displayed on the device 13. The card user shows the "OK" mark to the store clerk, thereby identifying that the card user is the authorized card holder (step A4).

When the "OK" mark is displayed, the clerk identifies that the card user corresponds to the authorized card holder. The clerk then sets the card in the emboss-in-printer in the same manner as a regular credit card, thereby issuing a receipt.

However, when the identification number entered at the keyboard 12 does not correspond to that stored in the memory 305, the "OK" mark is not displayed. In this case, the card user must reenter the identification number (step A2).

When the input identification number does not coincide with the stored identification number five consecutive times, the card is invalidated since the terminal device determines that the card user does not correspond to the authorized card holder. At the same time, "EE...E" is displayed on the device 13 to indicate that the card is invalidated (step A5).

The intelligent card of the present invention is used in the above manner. The operation of the circuit shown in FIG. 3 will be described with reference to FIG. 5.

A predetermined identification number is stored in the area N (305b) of the EEP-ROM 305 when the card 10 is issued to the authorized holder, and at the same time, the area M (305c) is cleared (step B1). When the predetermined identification number is entered into the area N (305b) of the EEP-ROM 305, the authorized user or customer enters the predetermined identification number into an intelligent card sent to the user or customer from a card issuer such as a bank or a credit corporation through a given sequential operations of keys, like numeral keys followed by twice operations of the collation function key "CF". The entered identification number is encrypted by an encryption circuit (not shown) and the encrypted identification number is stored in the area N (305b) of the EEP-ROM 305.

When a card user enters an identification number at the keyboard 12, for identification, the numeric data representing the identification number is stored in the A register in the section 312, the input data is displayed on the device 13 (step B2).

When the card user depresses the "CF" key 12C, the discriminator 310 discriminates that the key 12C is depressed (step B3) and supplies an output signal to the section 311 through the line a. The section 311 checks in step B4 whether or not the invalid flag in the area L in the EEP-ROM 305 is set at logic "1". If YES in step B4, the flow is ended. However, if NO in step B4, the flow advances to step B5. The identification number encrypted and stored in the area N (305b) in the EEP-ROM 305 is supplied to the section 314 and decrypted thereby. The decrypted identification number is temporarily stored in the buffer 314a.

In step B3, when any one of the keys 12A and 12B excluding the "CF" key 12C is depressed, the flow advances to step B18 wherein an arithmetic operation or the like is performed.

In step B6, the input number stored in the A register is compared by the comparator 316 with the decrypted number stored in the buffer 314a.

When these numbers coincide with each other, the flow advances to step B7. In step B7, the area M (305c) in the EEP-ROM 305 is cleared (step B6), and the flow advances to step B8.

In step B6, address data for designating the area M by the section 311 via the bus line d and "0" data via the bus line c are supplied to the EEP-ROM 305. At the same time, a step-up command is also supplied thereto via the bus line d to supply a high voltage to the EEP-ROM 305 from the step-up circuit 305a, thereby writing data "0" in the area M.

In order to display the "OK" mark in step B8, the section 311 writes a character code corresponding to "OK" in the X register through the line h, and the character code is supplied from the X register to the section 315, thereby displaying "OK" on the device 13.

When "OK" is displayed, the section 311 supplies the start signal to the counter 318 through the line j to drive the counter 318 until a carry signal is generated therefrom (step B9) through the line k. When 10 seconds have elapsed and the carry signal is generated, the section 311 clears the character code written in the X register, thereby clearing "OK" from the screen of section 13 (step B10).

For this reason, even if the card 10 is stolen after the authorized holder has purchased a desired item in a first store, the same card cannot be used in another store. The card can be used once only for each identification, thereby preventing misuse.

If NO in step B6, the flow advances to step B11, and the content of the area M (305c) in the EEP-ROM 305 can be written in the B register through the line e.

In step B12, the content of the area M (305c) is cleared once. In the next step B13, the content of the B register is incremented by the arithmetic circuit 313 by one. Thereafter, the updated content of the B register is stored in the area M (305c) in step B14.

At this time, the area M is designated by the address data sent from the section 311 through the bus line d, and a high voltage is generated from the step-up circuit 305a. Therefore, the content of the register B can be written into the area M.

In step B15, "ERROR" is displayed on the device 13 to indicate a noncoincidence between the entered and decrypted identification numbers. More specifically, the section 311 writes a character code corresponding to "ERROR" in the X register. The character code is processed by the section 315, and "ERROR" is displayed on the screen 13.

In step B16, the content of the B register which is updated in step B13 is supplied to the comparator 317. The content is then compared with "5" from the section 311 so as to check whether or not these data coincide with each other. If NO, i.e., when the number of times of noncoincidence between the input and decrypted identification numbers has not reached "5", the displayed content is cleared by the key 12D, and the input enable state is restored (step B2).

However, if YES in step B16, i.e., when the content of the B register represents "5", the coincidence signal is supplied from the comparator 317 to the section 311 through the line m. The flow then advances to step B17 wherein card invalidation processing is performed. More specifically, the invalid flag of logic "1" is set in the area L in the EEP-ROM 305, and at the same time, the character code for displaying "EE...E" is written in the X register. The "EE...E" is displayed to indicate that the card is invalidated. The card can be no longer used. Once the invalid flag is written in the area L, the flag cannot be reset even by operation of the key 12D or power-off operation.

A second embodiment of the present invention will be described hereinafter. In the first embodiment, identification operation is performed in a key input cycle of numeric keys and the CF key in the order named, so that collation cannot be performed until the key 12C is depressed, and the input identification number is kept displayed. Therefore, when the card user forgets to depress the key 12C after the identification number is entered, other persons can know the user's identification number.

According to the second embodiment, the input order of numeric keys and the CF key are reversed. When the number of digits of the input data coincides with that of the prestored identification number, the displayed content is automatically cleared to prevent a third party from watching the displayed content, and collation is thereby started.

The second embodiment can be implemented by adding only a D register in the memory section 312 of FIG. 3.

Figure 6:
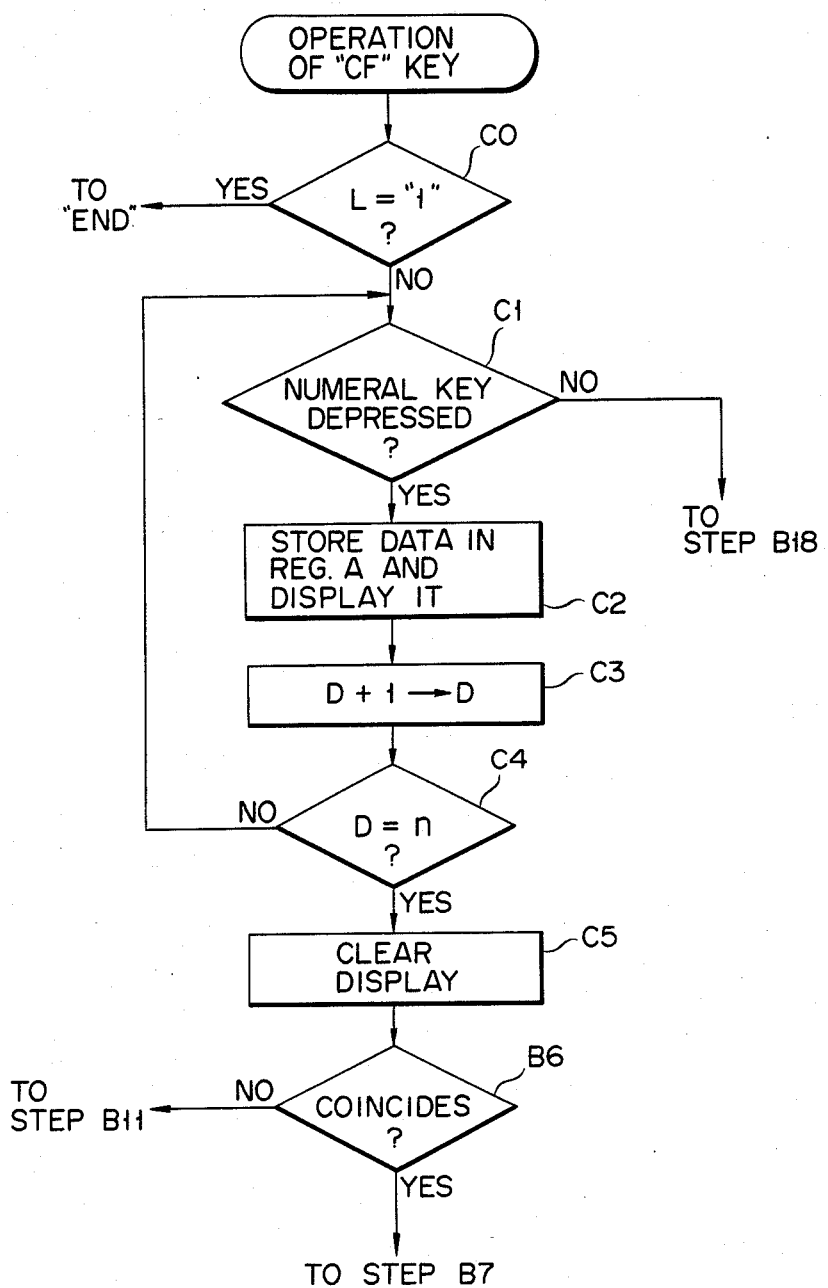
FIG. 6 is a flow chart for explaining the operation according to a second embodiment of the present invention.

FIG. 6 is a flow chart for explaining the operation of the second embodiment.

In order to identify a card user as the authorized card holder, the user depresses a CF key 12C. The comparator 317 checks in step C0 whether or not an invalid flag in the area L is set at logic "1". If YES, the flow is ended. However, if NO in step C0, the flow advances to step C1. An identification number is entered in an A register (steps C1 and C2). In this case, the content of the D register is updated in step C3 every time input data is entered. The content of the D register is incremented by one, and the number of digits of the input data is stored in the D register.

In step C4, the content of the D register is compared by the comparator 317 with the number n of digits of the identification number stored in the control section 311. If NO in step C4, the flow returns to step C1, and the input enable state is restored. Up to step C4, the content of the D register is displayed every time input data is entered.

If YES in step C4, the flow advances to step C5 to clear the displayed content. When the input data stored in the A register is no longer supplied to a display processing section 315, no display is performed.

In the same manner as described with reference to FIG. 5, the flow advances to step B6 and collation is performed. The subsequent operations are the same as those of FIG. 5.

A third embodiment of the present invention will be described hereinafter. Unlike the first embodiment wherein embossed portions 11A and 11B are formed on only the upper sheet 11 of the card body 10, a connector 150 having a plurality of contacts 15 is arranged as shown in FIG. 7, and the card body 10A can be connected to a terminal device or a POS terminal.

FIG. 8 is a block diagram of the intelligent card 10A of FIG. 7. The connector 150 is connected to a CPU 301 to exchange data with external devices like a terminal device.

A fourth embodiment of the present invention will be described hereinafter. Instead of the connector 150 of the third embodiment, there are provided a light-emitting element 151 such as an LED for emitting light to transmit data and a photosensor 152 for supplying external data to a card 10B according to the fourth embodiment, as shown in FIG. 9. In this case, data communication can be performed in a noncontact manner, i.e., optically, so that the card 10B will not be contaminated and is resistant to electrostatic energy.

Figure 10:
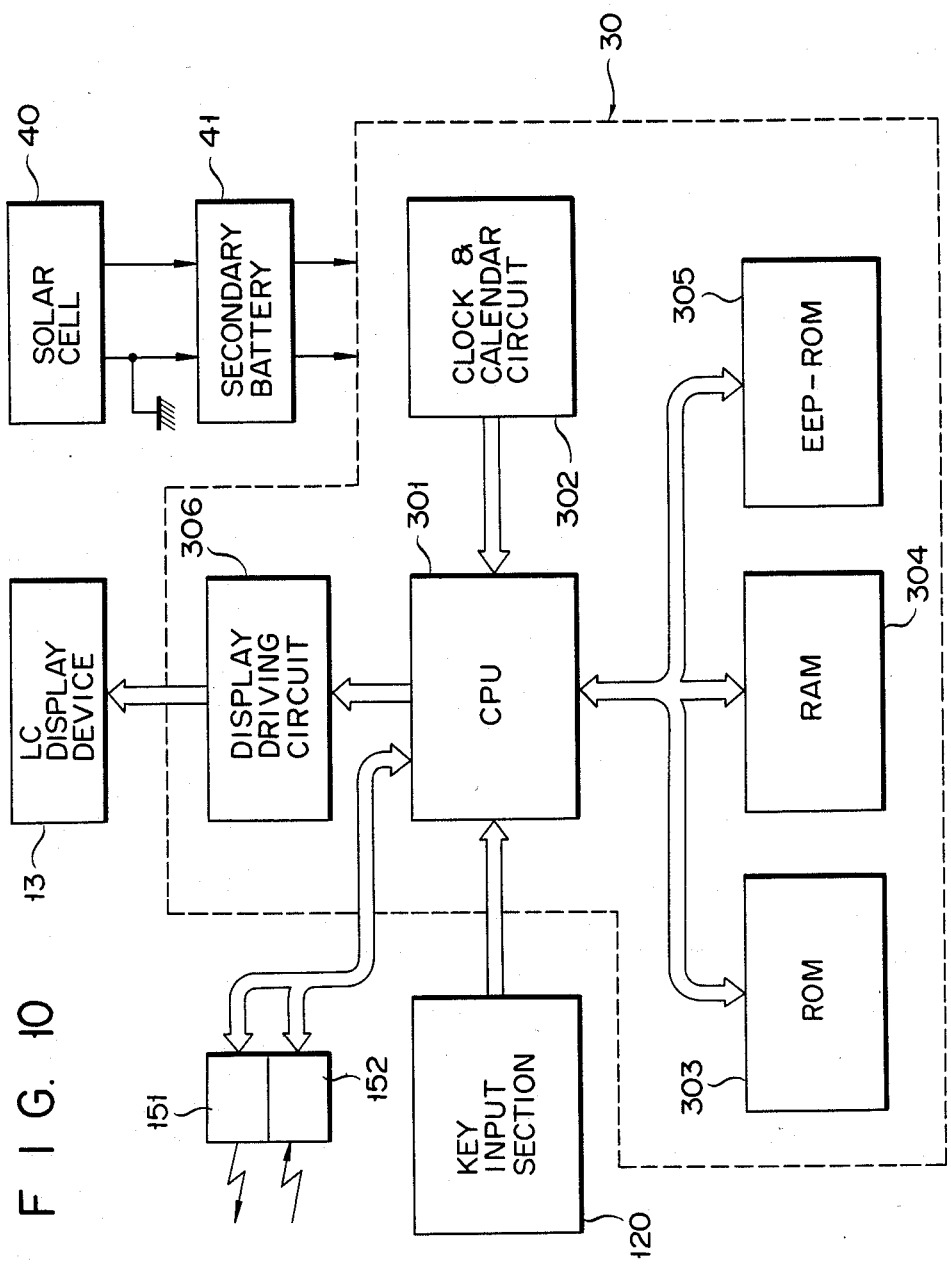
FIG. 10 is a block diagram of a circuit of the intelligent card of FIG. 9.

FIG. 10 shows a circuit block of the intelligent card 10B of the fourth embodiment. The element 151 and the photosensor 152 are connected to the CPU 301 to exchange data with external devices.

The step-up circuit 305a is arranged in the EEP-ROM 305 of FIG. 3. However, when the EEP-ROM 305 is the type in which data can be written at a normal voltage level, the step-up circuit 305a can be omitted. An area N (305b) stores the encrypted identification number. However, the identification number can be stored in a binary coded decimal or binary coded hexadecimal form.

Although a counter 318 is arranged to clear "OK" within 10 seconds, a predetermined register in a memory section 312 and an arithmetic circuit 313 can be used to constitute a counter function. A count time is not limited to 10 seconds.

Instead of displaying only "OK", the "OK" mark can be used together with a buzzer sound, and these indication means can be automatically cleared when a predetermined period of time has elapsed. Furthermore, the identication number is not limited to numeric values, but can be replaced with letters or symbols. In this case, a keyboard 12 has letter and symbol keys.

According to the embodiments described above, the self identification function is provided in the intelligent card. Unlike in the case of conventional cards, an expensive terminal device need not be installed in a retail store with small capital.

Furthermore, when the input identification number coincides with the decrypted identification number, the display means is cleared after about 10 seconds. Therefore, the card can be used only once for each identification, thereby preventing misuse.

When coincidence is not established, the EEP-ROM is updated to store updated data in the area storing data prior to updating. Therefore, the memory area will be effectively used.

In the above embodiments, collation is performed by depressing numeric keys 12A and the CF key 12C on the keyboard 12. Since the intelligent card may be carried in a pocket or a bag, an identification number can be unintentionally entered and the CF key can be depressed. In such a case, a correct number will not be entered, and coincidence will not be established. Therefore, the card may be invalidated without the awareness of the card holder.

Figures 11, 14:
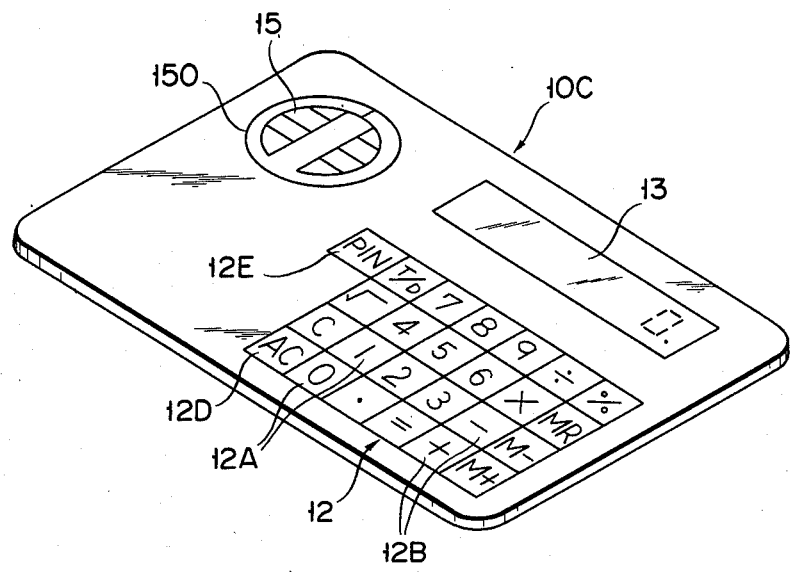
FIG. 11 is a perspective view showing the outer appearance of an intelligent card according to a fifth embodiment of the present invention.
FIG. 14 is a perspective view showing the outer appearance of an intelligent card according to a sixth embodiment of the present invention.

The following embodiment prevents such a failure. The same reference numerals in the following embodiment denote the same parts as in the above embodiments. Referring to FIG. 11, an intelligent card 10C is substantially the same as that of FIG. 1B, except that a connector 150 and a "PIN" key 12E arranged in place of the CF key 12C to enter an identification number are arranged in a keyboard 12. Therefore, the circuit of FIG. 11 is similar to that of FIG. 3. The solar cell 40 of FIG. 8 can be arranged on the lower surface of a case 10C, or a paper-like lithium battery can be incorporated in the case 10C. Embossed portions 11A and 11B are formed on the lower surface of the case 10C in the same manner as in FIG. 1A.

As shown in FIG. 3, a key discriminator 310 includes a buffer 310a for temporarily storing a key input signal generated from the section 120 and a detector 310b for detecting whether or not the "PIN" key 12E is depressed. When the detector 310b detects that the "PIN" key 12E is depressed, the detector 310b generates an output signal through a line a. Otherwise, the output signal is generated through a bus line b.

The operation of the intelligent card of FIG. 11 will be described with reference to FIGS. 12 and 13.

Figure 12:
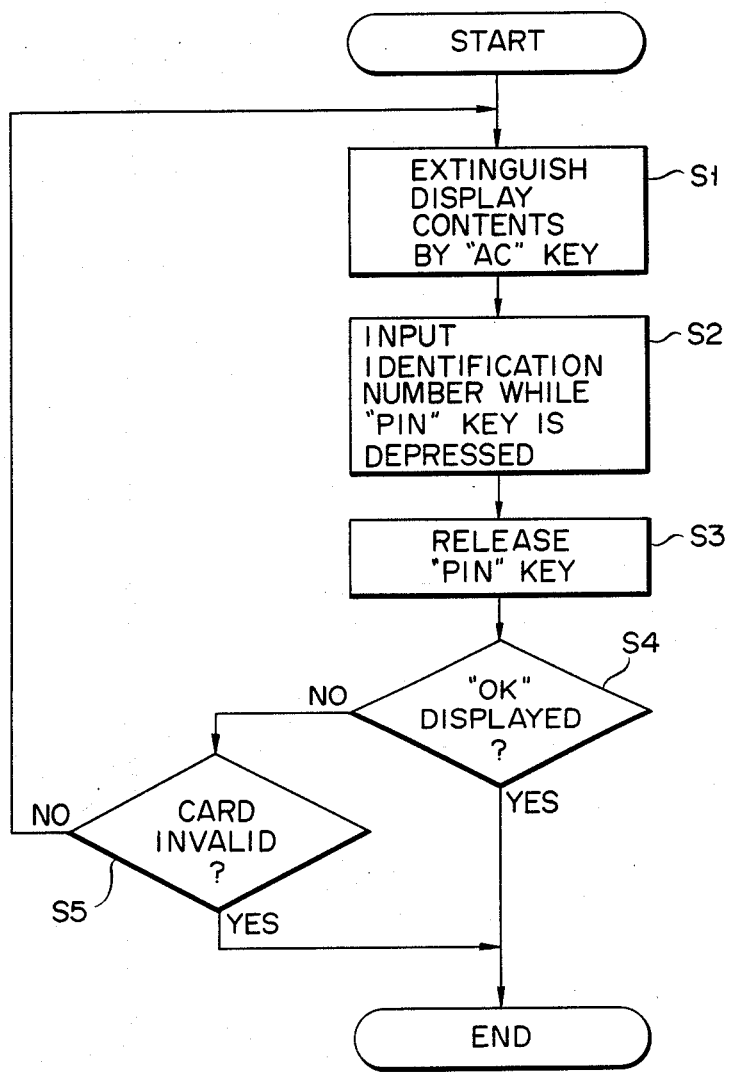

FIG. 12 schematically shows identification procedures performed by a card user. When the card user uses the intelligent card as a credit card instead of paying cash for a purchased item, the user depresses an AC key (all clear key) 12D in a keyboard 12 to clear the displayed content (step S1). A desired number is entered by numeric keys 12A of the keyboard 12 while the user depresses the key 12E (step S2).

When the identification number is entered, the user releases the key 12E (step S3), and the internal circuit compares the entered identification number with the decrypted identification number. When a coincidence between these identification numbers is established, "OK" is displayed on a liquid crystal display device 13, thereby identifying that the card user corresponds to the authorized card holder (step S4).

When "OK" is displayed, a store clerk identifies that the card user corresponds to the authorized card holder. The store clerk sets the intelligent card in the emboss-in-printer in the same manner as for a normal credit card, thereby preparing a receipt.

When the identification number entered at the keyboard 12 does not coincide with the stored identification number, "OK" is not displayed. In this case, the user depresses the key 12D again to reenter the identification number.

When noncoincidence occurs, for example, five times consecutively, a control section 311 determines that the card user does not correspond to the authorized card holder, thereby displaying "EE ... E" so as to indicate that the card is invalidated (step S5). The invalidation operation is the same as in FIG. 3, and a detailed description thereof will be omitted.

The intelligent card of the present embodiment is used in the above manner, and the operation of the circuit thereof of FIG. 3 will be described with reference to FIG. 13.

A given identification number is stored in the area N (305b) in the EEP-ROM 305 upon issuance of an intelligent card, and at the same time, the area M (305c) is cleared (step T1).

The card user enters an identification number by numeric keys 12A while depressing the key 12E. During depression of the key 12E, an output signal supplied from a key discriminator 310 is supplied to the section 311 through the line a. The section 311 determines that the key 12E is being depressed (step T2). Subsequent numeric data are sequentially supplied by the section 311 from the buffer 310a to the A register in a memory section 312, and at the same time, the input data are displayed on the liquid crystal display device 13 (step T3).

In step T4, every time data is entered at the keyboard 12, the area C1 of the C register is incremented by one. The area C1 stores the number of digits of input data. The content of the area C1 is cleared after the key 12D is depressed or collation is completed.

When the user finishes entering the identification number and releases the key 12E, the discriminator 310a stops generating the output signal through the line a. The flow then advances to step T6.

The section 311 checks in step T6 whether or not the content (i.e., the number of digits of the input data) of the area C1 has reached "3" for the following reason. When the user accidentally releases the key 12E during input of the identification number, collation is erroneously started. Thereafter, the content of the area C1 is supplied to the comparator 317 and compared with the constant "3" generated from the section 311. If condition $C1 \leq 3$ is established, the comparator 317 detects an input error. The flow returns again to step T2, and the displayed content is cleared. The input enable state is restored. However, if condition $C1 > 3$ is established in step T6, the flow advances to step T7.

In step T7, the identification number encrypted and stored in the area N (305b) in the EEP-ROM 305 is supplied to and decrypted by a decryption section 314. The decrypted identification number is temporarily stored in a buffer 314a. The entered number stored in A register is compared by a comparator 316 with the number stored in the buffer 314a. The subsequent operations are the same as those of FIG. 5.

When another key excluding the key 12E is depressed in step T2, the flow advances to step T19, so that the intelligent card can serve as a normal electronic calculator.

In the above embodiment, automatic collation can be started upon release of the key 12E. However, according to a sixth embodiment to be described with reference to FIG. 14, an intelligent card further has a CF key 12C. The user enters numeric data while depressing the key 12E. When he finishes entering the numeric data, he depresses the "CF" key 12C, thereby starting collation.

Figure 15:
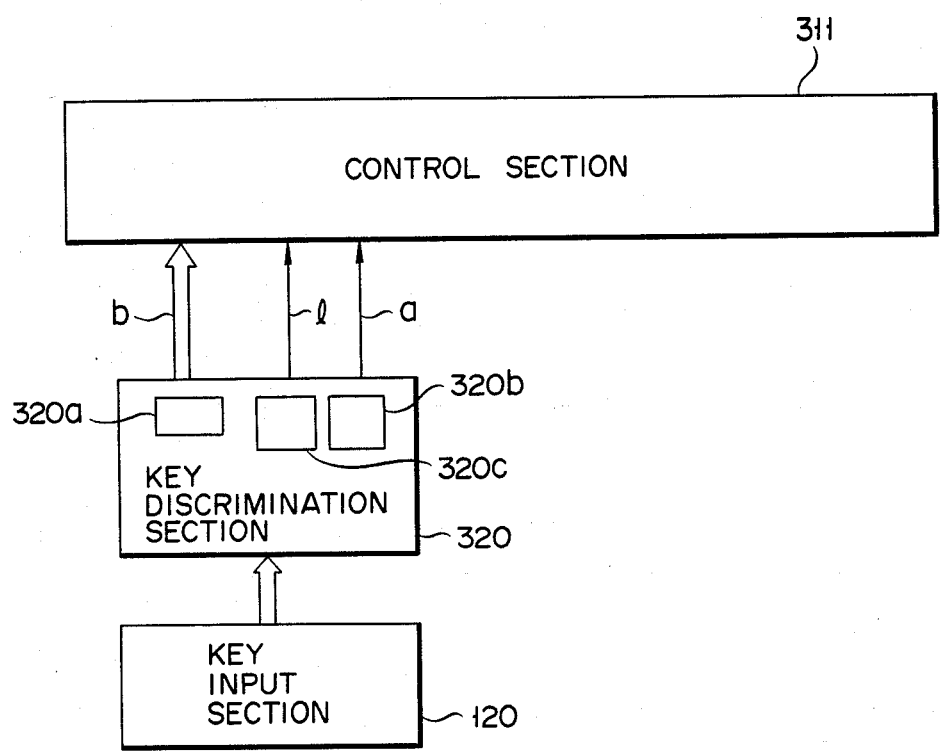
FIG. 15 is a block diagram showing the main part of the intelligent card of FIG. 14.

According to this embodiment, the key discriminator 310 of FIG. 3 can be replaced with a key discriminator 320 of FIG. 15. The discriminator 320 further comprises a detector 320C for detecting depression of the key 12C, and supplies an output signal to a control section 311 through a line l.

FIG. 15 shows only a key input section 120, the key discriminator 320 and the control section 311. Other circuit arrangements are the same as those of FIG. 3, and a detailed description thereof will be omitted.

Figure 16:
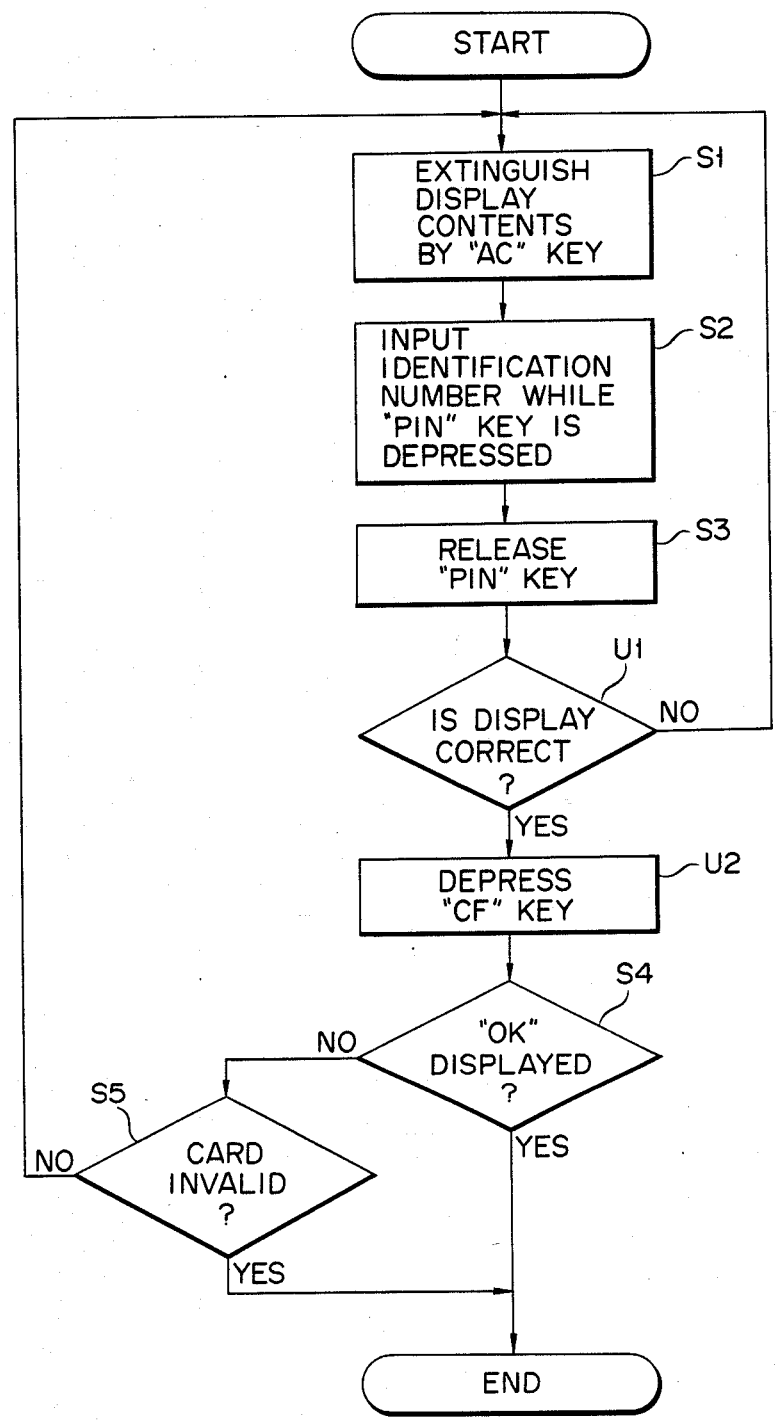
FIGS. 16 and 17 are respectively flow charts for explaining the operation of the intelligent card shown in FIGS. 14 and 15.

FIG. 16 is a flow chart for explaining the operation of the sixth embodiment. Steps U1 and U2 are added between steps S3 and S4 in the flow chart of FIG. 12.

After the displayed content is cleared by the AC key (step S1), the user enters the identification number while depressing the PIN key 12E (step S2). When the identification number is completely entered, the user releases the key 12E (step S3). The user checks the displayed content (step U1). When it differs from what he intended, he clears the displayed content by using the AC key and reenters the correct identification number. However, when the display content represents data intended, the user depresses the key 12C, thereby instructing collation (step U2).

When the input identification number coincides with the stored identification number, "OK" is displayed (step S4). However, when the input identification number does not coincide with the stored identification number, the section 311 checks in step S5 whether or not the card is invalidated.

Figure 17:
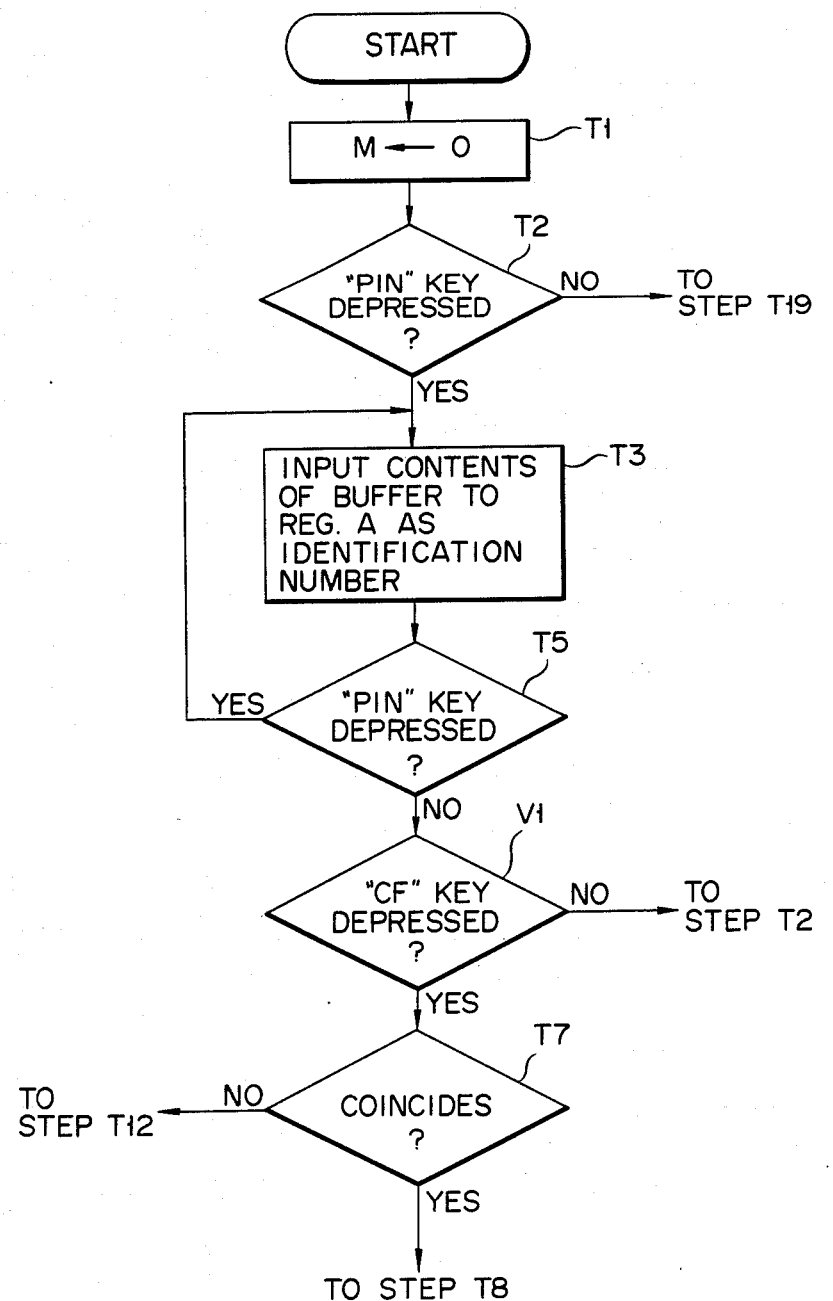

The operation of the sixth embodiment will be described with reference to the flow chart of FIG. 17. Step V1 is added in place of steps T4 and T6 of the flow chart of FIG. 13. The same steps as in the flow chart of FIG. 13 are omitted from those of FIG. 17.

The operations in steps T1 to T3 are the same as those of FIG. 13, and a detailed description thereof will be omitted. The flow in FIG. 17 advances from step T3 to step T5. The section 311 checks in step T5 whether or not the "PIN" key 12E is depressed.

When the key 12E is released, the flow advances to step V1 to check whether or not the key 12C is depressed. The section 311 causes the discriminator 320 to check in step V1 whether or not the key 12C is depressed. A detection signal from the discriminator 320 is supplied to the section 311 through the line 1. However, if NO in step V1, the flow returns to step T2. When the section 311 determines that the key 12C is depressed, the flow advances to step T7, thereby starting collation.

According to the sixth embodiment, card identification is not started until the key 12C is depressed after the identification number is entered at the keyboard 12. Therefore, the user can check the input data. When an erroneous input is entered, the screen is cleared, and the proper data is reentered. When the card user is an authorized card holder, invalidation of the card caused by erroneous inputs can be prevented.

As is apparent from the above description, comparison data (i.e., the identification number) is entered while the key 12E (i.e., the first collation key) is being depressed. Even if keys are erroneously depressed while the card is being carried, unintended card collation operation can be completely prevented. When the number of digits of the input data exceeds a predetermined value, card identification is started. Even if the key 12E is released during identification number input operation, erroneous collation will not be started. Therefore, during use of the card, invalidation caused by identification number input errors can be completely prevented.

A CF key 12C (i.e., the second collation key) can be arranged in addition to the PIN key 12E (i.e., the first collation key). In this case, the identification number is entered while the key 12E is being depressed. Thereafter, when the key 12C is depressed, automatic collation is started. The card user can visually check the input data before automatic data collation is started. Therefore, input errors can be prevented.

The following embodiments exemplify intelligent cards having clock (i.e., timepiece) and calendar functions in addition to the self identification function of the previous embodiments. The clock and calendar functions also provide a valid date discrimination function.

Figure 18A:
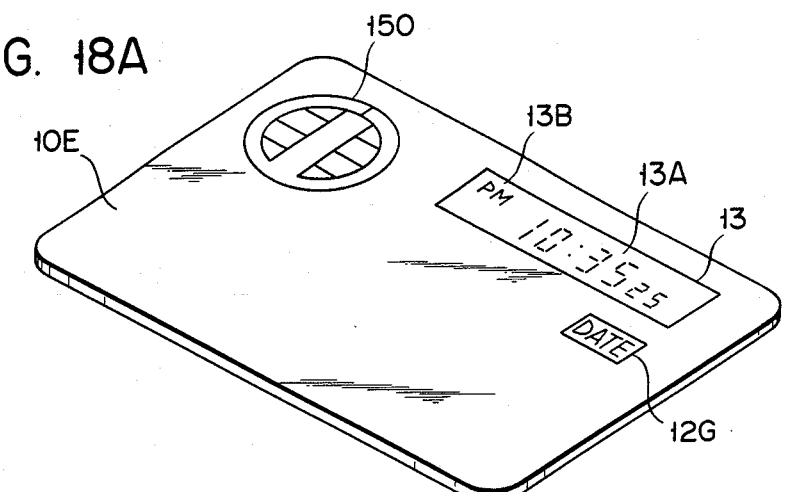
FIGS. 18A to 18C are respectively perspective views showing an intelligent card according to a seventh embodiment of the present invention.
Figure 18B:
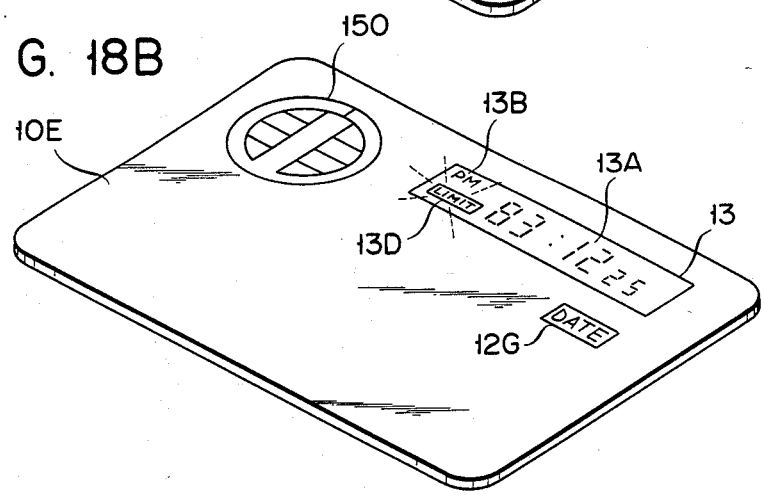
Figure 18C:
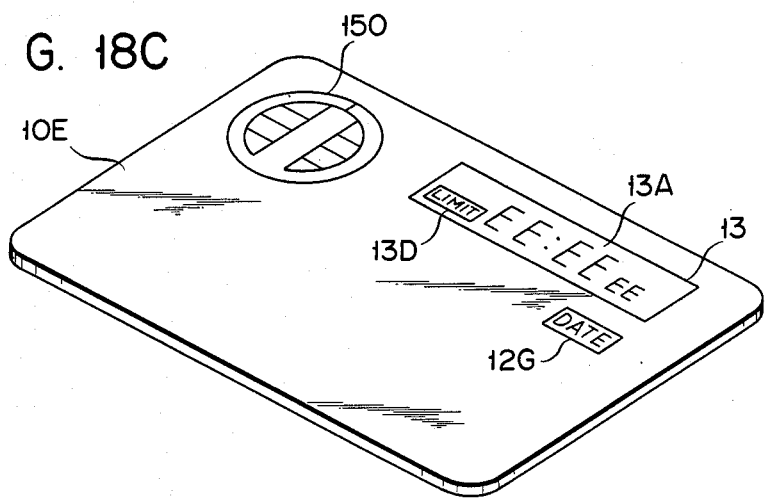

Referring to FIGS. 18A to 18C, a display device 13 comprises a clock & calendar display section 13A, a PM display section 13B for representing morning or afternoon time, and an invalid date LIMIT mark 13D. The device 13 is located near a date key 12G.

Figure 19:
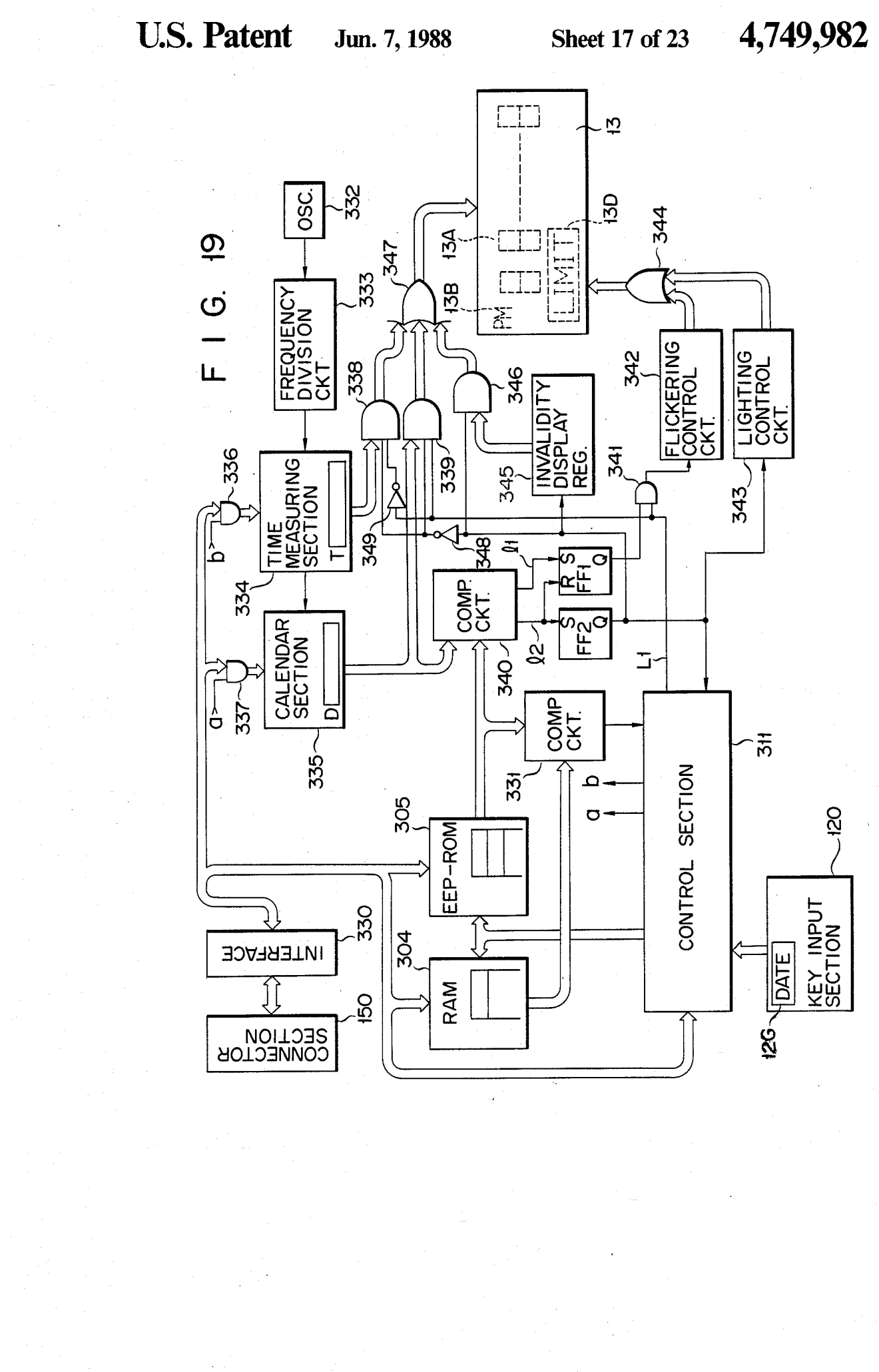

Referring to FIG. 19, while the card user is depressing the key 12G, a control section 311 continuously generates a signal of logic "1" onto a signal line L1. The section 311, a RAM 304 and an EEP-ROM 305 are connected to a connector section 150 through an interface 330. The storage contents of the RAM 304 and the EEP-ROM 305 are supplied to a comparator 331 under the control of the section 311. Comparison results are supplied to the section 311. Referring to FIG. 19, reference numeral 332 denotes an oscillator for generating a reference frequency signal for measuring time. An output from the oscillator 332 is divided by a frequency divider 333 into 1-Hz signals which are then supplied to a time measuring section 334. The section 334 comprises a time-measuring T register. The T register counts 1-Hz signals or 1-second signals from the frequency divider 333 to obtain hour, minute and second data. A day change signal is generated from the section 334 for every 24 hours and supplied to a calendar section 335. The section 335 comprises a calendar D register. The D register counts the day change signals from the section 334 to obtain calendar data including year, month and day data. Set data supplied from an external terminal device through the section 150 and the interface 330 is received by the sections 334 and 335 through AND gates 336 and 337. The AND gates 336 and 337 are enabled in response to gate signals a and b supplied from the section 311, respectively. The time counting data from the section 334 is supplied to an AND gate 338. The calendar data from the section 335 is supplied to an AND gate 339 and a comparator 340. The comparator 340 also receives data read out from the EEP-ROM 305. The comparator 340 compares the calendar data generated from the section 335 with the valid date data stored in the EEP-ROM 305. When the current date is one month prior to the end of the valid date, the comparator 340 generates a signal of logic "1" through the line l1 to set a flip-flop FF1. When the last day of the valid period is reached, the comparator 340 generates a signal of logic "1" through an output line l2 to reset the flip-flop FF1 and set a flip-flop FF2. An output signal from the flip-flop FF1 is supplied as an operation instruction to a flickering control circuit 342 through an AND gate 341. An output from the flip-flop FF2 is supplied to the section 311 and as an operation instruction to a lighting control circuit 343. Outputs from the circuits 342 and 343 are supplied through an OR gate 344 as drive signals for the LIMIT mark 13D to a liquid crystal display device 13. The output from the flip-flop FF2 is also supplied as an operation instruction to an invalid display register 345 and an AND gate 346. The register 345 stores invalid display data E having six digits. When the operation instruction is supplied from the flip-flop FF2 to the register 345, the storage data is supplied from the register 345 to an OR gate 347 through the AND gate 346. The output signal from the flip-flop FF2 is further supplied to AND gates 338 and 339 through an inverter 348. The signal generated from the section 311 onto a line L1 is directly supplied to the AND gates 339 and 341. The signal from the section 311 is also supplied to the AND gate 338 through an inverter 349. Output signals from the AND gates 338 and 339 are supplied to the OR gate 347, and an output signal from the OR gate 347 is supplied to the device 13 as the drive signal for the section 13A and the PM section 13B.

Figure 20:
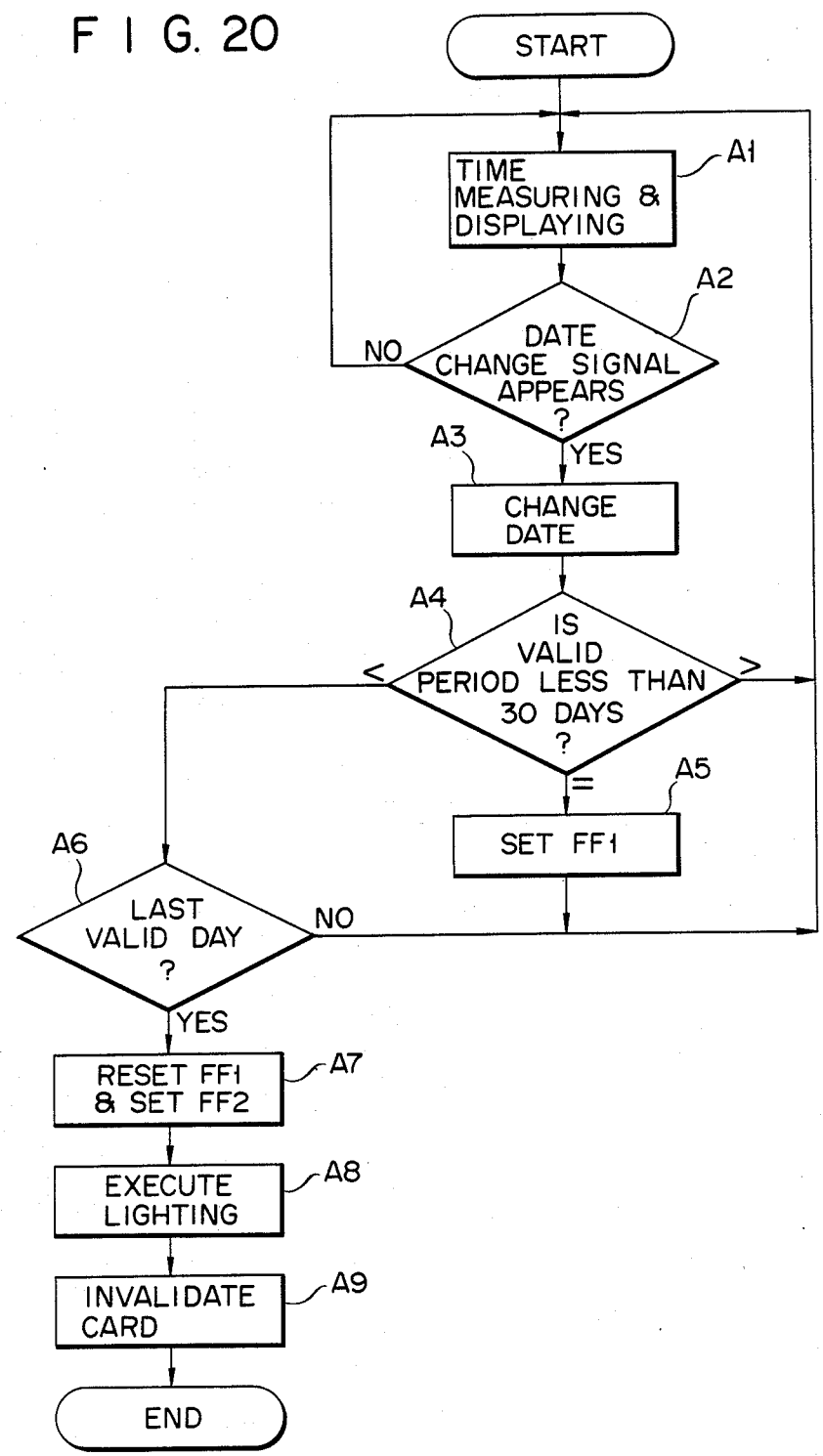
FIGS. 20 and 21 are respectively flow charts for explaining the operation of the intelligent card of FIGS. 18A to 18C.
Figure 21:
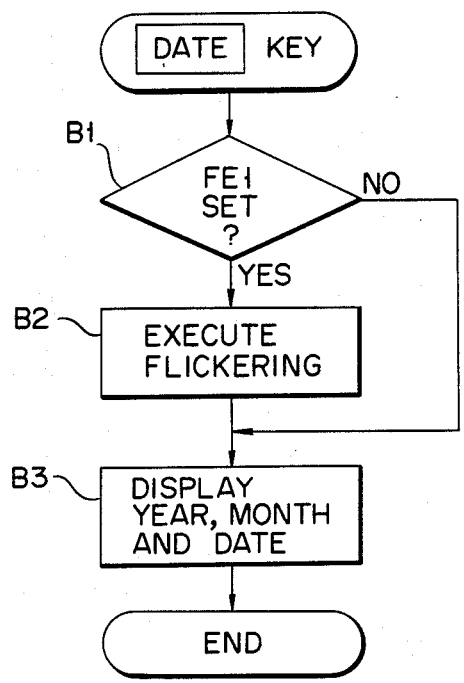

The operation of the seventh embodiment of the present invention will be described with reference to the flow charts of FIGS. 20 and 21. In a card body 10E having the arrangement as described above, an identification number and a valid date are written from the terminal device to the EEP-ROM 305. In this case, the current time is set in the section 334. At the same time, the current date is set in the section 335. More specifically, the gate signals a and b are selectively supplied from the section 311 to the AND gates 336 and 337 on the basis of the instruction from the external terminal device. The calendar and time counting data supplied from the external terminal device through the section 150 and the interface 330 are set in the sections 335 and 334, respectively. In normal operation, the signal generated from the section 311 onto the line L1 is set at logic "0". The signal from the inverter 349 is set at logic "1". The signal of logic "1" is thus supplied to the AND gate 338. The flip-flops FF1 and FF2 are reset, and outputs therefrom are set at logic "0". For this reason, the output from the inverter 348 is set at logic "1" which is supplied to the AND gate 338 to enable it. The time data counted by the section 334 is supplied to the device 13 through the AND gate 338 and the OR gate 347. As shown in FIG. 18A, the time data is displayed in the section 13A. At the same time, as shown in step A2 of FIG. 20, the section 311 checks whether or not the day change signal from the section 334 is present. If YES in step A2, the calendar data (year, month and day) counted by the section 335 is updated, as shown in step A3. The flow advances to step A4, and the valid date stored in the EEP-ROM 305 is supplied to the comparator 340 which calculates a subtraction "(valid date)—(current date)", thereby determining remaining days up to the expiration date. The comparator 340 compares the remaining days with the number of days of the last valid month. When the section 311 determines that the remaining days are shorter than the last valid month, the flow returns to step A1, and the above operations are repeated. However, when the section 311 determines that the remaining days are within the last valid month, the flow advances to step A5 to set the flip-flop FF1, thereby supplying the signal of logic "1" to the AND gate 341. In this state, the control section 311 can supply the operation instruction to the circuit 342. Thereafter, the flow returns to step A1, and the above operations are repeated. When the section 311 determines in step A4 that the remaining valid days are fewer than the days of the last month, the flow advances to step A6. The section 311 causes the comparator 340 to check in step A6 whether or not the last valid day corresponds to the date data. If NO in step A6, the flow returns to step A1, and the above operations are repeated. Thereafter, when YES in step A6, the flow advances to step A7. In this step, the output from the comparator 340 resets the flip-flop FF1 and sets the flip-flop FF2. The flow then advances to step A8 wherein the LIMIT mark is turned on so as to indicate invalidation of the card. More specifically, when the flip-flop FF2 is set, the operation instruction is supplied to the circuit 343. When the circuit 343 is operated, the lighting signal of the LIMIT mark 13D is supplied to the device 13 through the OR gate 344. The set output from the flip-flop FF2 causes the register 345 to receive the operation instruction and enables the AND gate 346. In this case, the output from the inverter 348 is set at logic "0" to disable the AND gates 338 and 339. The data E stored in the register 345 is supplied to the device 13 through the AND gate 346 and the OR gate 347 and displayed on the section 13A. When the valid date of the intelligent card has expired, the LIMIT mark 13D is turned on, as shown in FIG. 18C and Es are displayed at all digit positions of the section 13A, so that the card user knows the card 10E is invalid. The set output from the flip-flop FF2 is supplied to the section 311 to perform card invalidation processing in step A9.

In the normal use of the intelligent card 10E, the current time is displayed on the device 13. In this state, when the user depresses the key 12G, the current date is displayed on the device 13. When the valid date falls within the last valid month, the LIMIT mark 13D flickers. As shown in the flow chart of FIG. 21, when the key 12G is depressed, the section 311 checks in step B1 whether or not the flip-flop FF1 is set. As described with reference to the flow chart of FIG. 20, when the valid date falls within the last valid month, the flip-flop FF1 is set. When the section 311 determines in step B1 that the flip-flop FF1 is set, the flow advances to step B2 wherein flickering processing is performed. When the flip-flop FF1 is set, an output therefrom is supplied to the AND gate 341, so that the signal generated from the section 311 onto the line L1 upon operation of the key 12G is supplied as the operation instruction to the circuit 342 through the AND gate 341. Therefore, the circuit 342 is operated to supply the flickering signal for the section 13D to the device 13 through the OR gate 344.

As shown in FIG. 18B, while the key 12G is being operated, the LIMIT mark 13D flickers. The signal generated from the section 311 onto the line L1 upon operation of the key 12G enables the AND gate 339. The output from the inverter 349 is set at logic "0" to disable the AND gate 338. The calendar data generated from the section 335 is supplied to the device 13 through the AND gate 339 and the OR gate 347. As shown in FIG. 18B, the calendar data is displayed on the section 13A. When the section 311 determines that the effective date does not fall within the last valid month upon operation of the key 12G, since the flip-flop FF1 has not been set, the flow advances from step B1 to step B3. In this case, only the calendar data is displayed. When the user releases the key 12G, the normal time display mode is restored, as shown in FIG. 18A.

In order to use the intelligent card 10E, the card 10E is set in the external terminal device and an identification number is entered at a key input section of the external terminal device. The input number is written in the RAM 304 from the terminal device through the connector 150 and the interface 330. The section 311 is operated in accordance with the instruction from the terminal device. The identification numbers stored in the EEP-ROM 305 and the RAM 304 are compared by the comparator 331. A comparison result is transmitted to the terminal device. The comparison operation determines whether or not the card user corresponds to the authorized card holder.

In the above embodiment, the intelligent card exchanges data with the external terminal device through the connector 150. However, an optical or electromagnetic means can be used in place of the connector 150. In the above embodiment, the current date is subtracted from the effective date stored in the RAM 304 to determine that remaining valid days are fewer than the days of the last valid month. However, date data which is one month prior to the expiration date can be prestored in the EEP-ROM 305. In the above embodiment, the device 13 is used to indicate the valid date. However, other means such as a buzzer can be used.

As is apparent from the above description, according to this embodiment, the clock function is added to the intelligent card. The clock function is utilized to discriminate the valid date. Therefore, the valid date discrimination informs the user of the expiration date, thereby providing an intelligent card which has a clock function for improving portability of the card and which prevents misuse.

Figure 22:
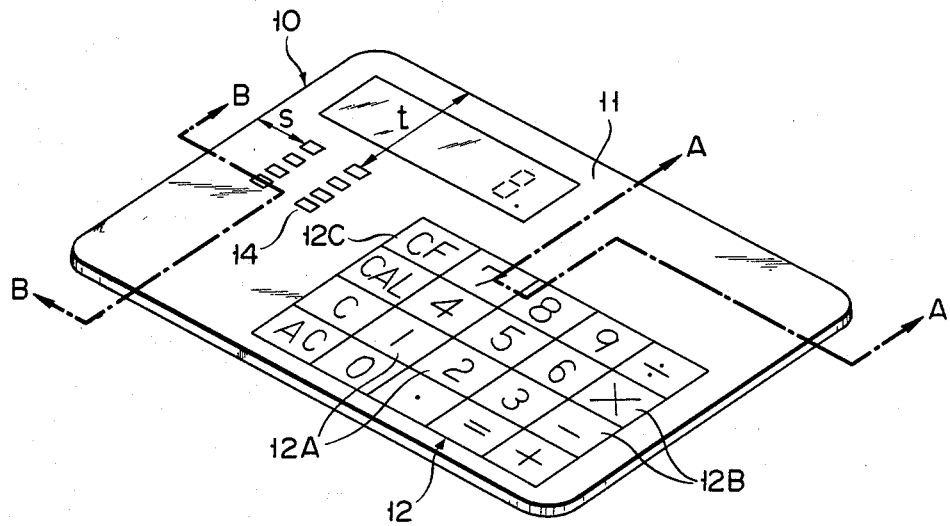
FIG. 22 is a perspective view showing the outer appearance of an intelligent card according to an eighth embodiment of the present invention.
Figure 23:
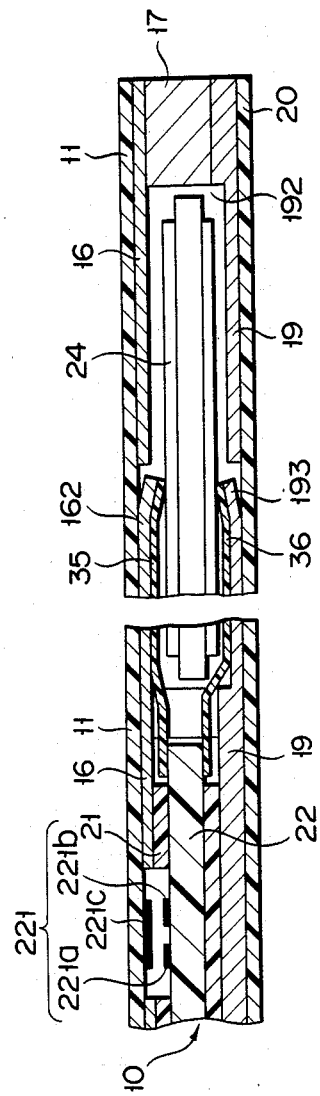
FIGS. 23 and 24 are sectional views of the intelligent card taken along the lines A—A and B—B of FIG. 22, respectively.

An intelligent card according to an eighth embodiment of the present invention will be described with reference to FIGS. 22 to 27. FIG. 22 shows the detailed outer appearance of the upper surface structure of the intelligent card of this embodiment. The upper surface of a case body 10 is covered with a flexible uppermost sheet 11 of transparent polyester or the like. A key input section 12 having a numeric data input section 12A, an arithmetic function data input section 12B and a collation instruction input section 12C is constituted such that corresponding characters are printed on the lower surface of the uppermost sheet 11. A transparent window of a display section 13 and contact openings 14 are formed in the uppermost sheet 11. Distal ends of a plurality of metal contacts 15 are exposed in the openings 14. The contacts 15 constitute a matrix of 2 columns×4 rows. The distal end of each rectangular contact 15 has a length L=2 mm and a width W=1.7 mm. The contacts 15 are arranged in units of 4 at intervals of 2.54 mm along the width of the case body 10 in two columns. A distance between the contact columns is set to be 7.62 mm. A distance S between the left short side of the case 10 and the left column contacts 15 is 10.25 mm, and a distance t between the upper long side of the case body 10 and the uppermost contacts 15 is 19.23 mm. The dimensions preferably comply with TC97/SC17 in the ISO standards. It should be noted that the contacts 15 are not indispensable to the present invention and can be arranged as needed. The outer dimensions of the case 10 are the same as those (i.e., a thickness of 0.8 mm, a length of 85.5 mm and a width of 54 mm) of a credit card which has embossed characters (to be described) and which complies with the ISO 2894.

The internal structure of the intelligent card shown in FIG. 22 will be described with reference to FIGS. 23, 24, 25A to 25H and 26. Referring to these figures, an upper sheet 16, a frame 17, an adhesive sheet 18, a lower sheet 19 and a lowermost sheet 20 are sequentially bonded under the sheet 11 to constitute the case body 10. A spacer 21 and a wiring board 22 overlap each other and are disposed in a space A in the frame 17 defined by the sheets 16 and 18. A liquid crystal display device 23 is inserted in a space B. A paper-like battery 24 is inserted in a space C. A through hole 161 is formed in a portion of the sheet 16 which corresponds to the device 23. A recess 191 is formed in a portion of the sheet 19 which corresponds to the through hole 161. A recess 192 is formed in the sheet 19 so as to correspond to the battery 24. A partially punched projection 193 is formed in the recess 192 so as to extend toward the battery 24. A partially punched projection 162 is formed in a portion of the sheet 16 which corresponds to the projection 193 and extends toward the battery 24.

The eight contacts 15 formed on the board 22 extend therefrom. These contacts 15 are sequentially inserted in contact holes 211 formed in the spacer 21, contact holes 163 formed in the sheet 16 and openings formed in the sheet 11.

The board 22 is made of a flexible material such as glass epoxy resin having relatively large rigidity. A plurality of fixed contact pairs 221 each having a pair of contacts 221a and 221b are formed at portions of the board 22 which correspond to the respective keys of the section 12. Each contact 15 comprises a copper film 15a having a gold-plated layer 15b thereon. The thickness of the contact 15 is about 0.03 to 0.05 mm.

An IC chip 30 for performing normal arithmetic operations such as four basic arithmetic calculations and an IC chip 31 for storing and collating the identification code are mounted on the board 22. More specifically, the chips 30 and 31 are inserted in through holes 222 and 223 formed in the board 22, respectively, and their terminals are bonded to a conductive film 224 formed on the lower surface of the board 22. A gold wire 31a is bonded to the chip 31, and the resultant structure is sealed with a resin material 31c. The contacts 15 are connected to the conductive films from the upper surface to the lower surface of the board through corresponding through holes 225 and are connected to predetermined terminals of the chip 31. The respective terminals of the chip 30 are connected to the fixed contacts 221a and 221b and terminals 226 connected to a connecting terminal 23a of the device 23.

The chips 30 and 31 slightly extend from the lower surface of the board 22. The extended portions of the chips 30 and 31 are fitted in the recesses 194 and 195 formed in the sheet 19, respectively.

A plurality of openings 164 and a plurality of openings 212 are formed in the sheet 16 and the spacer 21 so as to correspond to the fixed contact pairs 221 formed on the board 22, respectively. Movable contacts 221C are formed on the lower surface of the sheet 11 so as to oppose the contact pairs 221.

The sheets 16 and 19 are made of thin metal sheets of stainless steel or berryllium steel. The openings 161, 163 and 164 and the recesses 191 and 192 are formed by etching. The spacer 21 has a synthetic film base having adhesive layers on its upper and lower surfaces and is adhered between the sheet 16 and the board 22. The upper surfaces of the chips 30 and 31 are adhered to the spacer 21.

The device 23 comprises a low-profile device wherein a liquid crystal element is sealed between a pair of transparent base films of polyester or polysulfone. The device 23 is inserted in the space B. A film-like heat-sealed connector 23a is connected to the connecting terminals 226 formed on the lower surface of the board 22.

Figure 26:
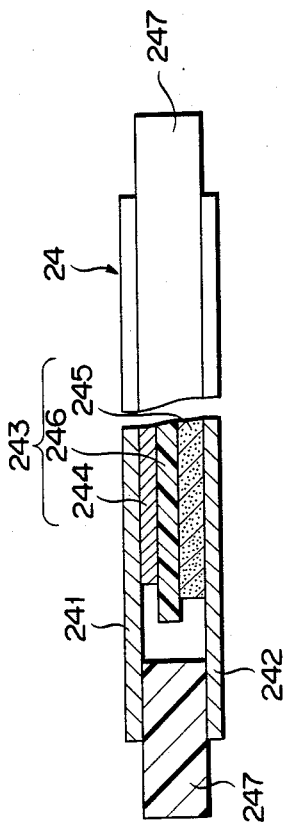
FIG. 26 is a sectional view of a battery shown in FIG. 25E.
Figure 25A:
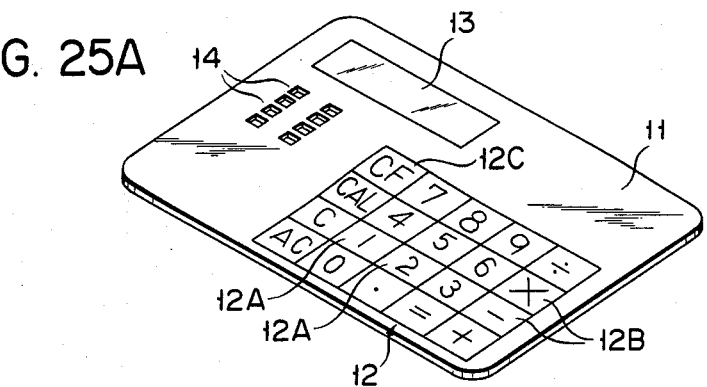
FIGS. 25A to 25H are respectively exploded perspective views showing the internal structure of the intelligent card of FIG. 22.
Figure 25B:
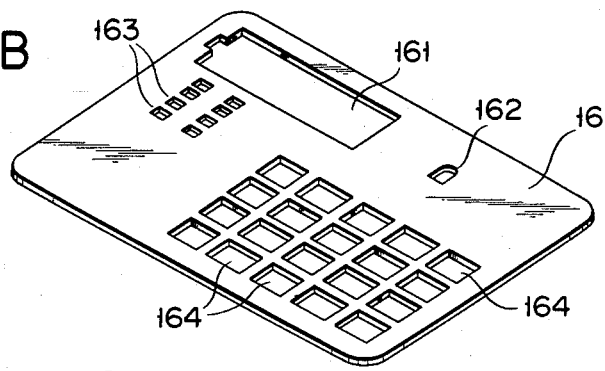
Figure 25C:
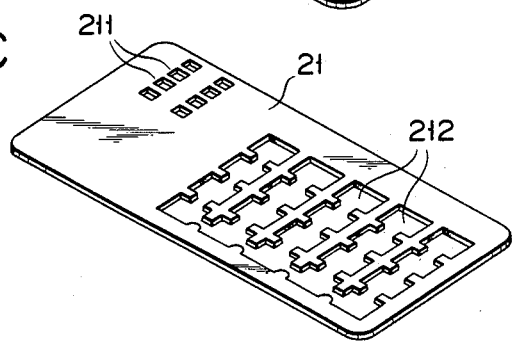
Figure 25D:
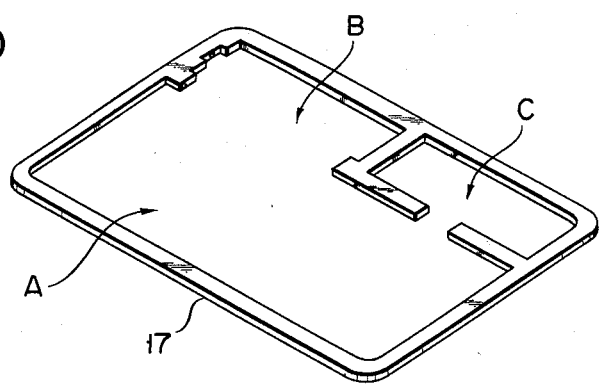
Figure 25E:
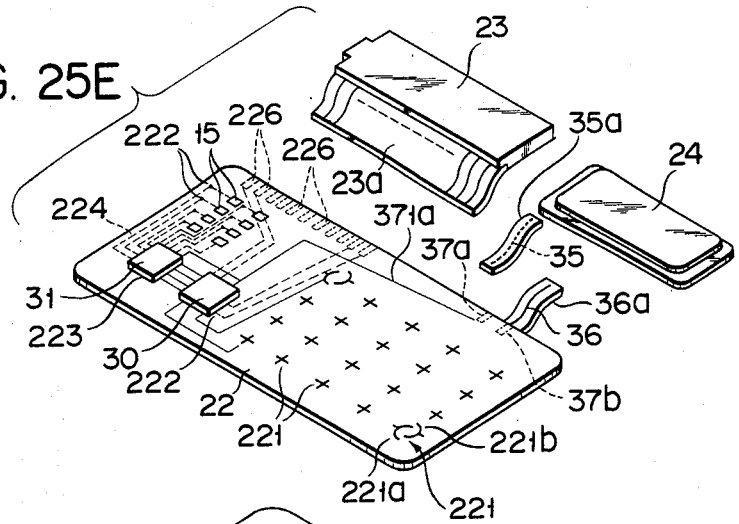
Figure 25F:
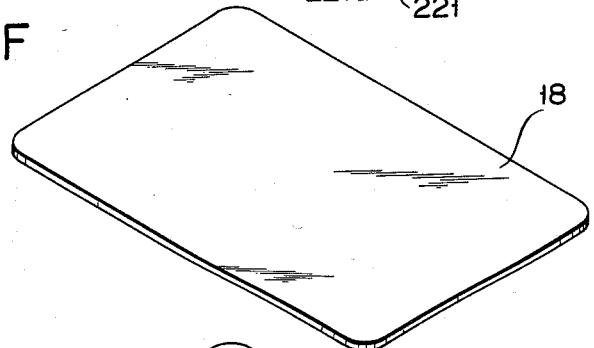
Figure 25G:
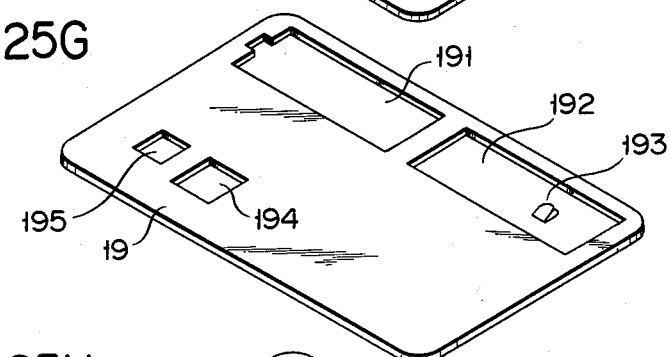
Figure 25H:
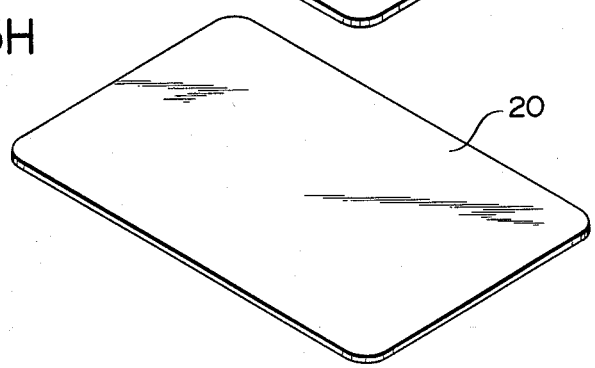

The paper-like battery 24 fitted in the space C of the frame 17 has a negative electrode 241 on its upper surface and a positive electrode 242 on its lower surface, as shown in FIG. 26. The electrodes 241 and 242 comprise thin conductive metal films of aluminum or stainless steel. An electric power generation unit 243 is inserted between the electrodes 241 and 242. The unit 243 is constructed in the same manner as a normal lithium battery such that a separator 246 obtained by impregnating an organic electrolytic solution in polypropylene unwoven fabric is inserted between a negative active material 244 of metal lithium and a positive active material 245 of manganese dioxide. In practice, the material 245 is printed on the inner surface of the positive electrode 242, and the material 244 is in contact with the negative electrode 241. A heat melting material 247 is adhered between the electrodes 241 and 242 to surround the unit 243.

The battery 24 is very thin and flexible and has high mechanical strength. The material 244 has a thickness of $50\mu$ to $80\mu$, the material 245 has a thickness of $150\mu$ to $180\mu$, the separator 246 has a thickness of $100\mu$ to $150\mu$, the unit 243 has a thickness of $350\mu$, and the electrodes 241 and 242 have thicknesses of $50\mu$, respectively. Therefore, the battery 24 has a total thickness of $450\mu$ (0.45 mm).

In the above embodiment, the battery 24 comprises a rectangular member having a size of 34 mm×17 mm and has an overall weight of 0.7 g. The discharge capacity of the battery 24 is 17 mA.

The battery 24 is connected to connecting terminals 37a and 37b formed on the upper and lower surfaces of the board 22 through a pair of power source leads 35 and 36. The terminals 37a and 37b are connected to the terminals of the chips 30 and 31 through conductive films 371a and 371b, so that the chips 30 and 31 are powered by the battery 24. The leads 35 and 36 are obtained such that a conductive metal is deposited or a conductive paint is patterned by screen printing on one surface of strip base films 35a and 36a of a synthetic resin. One end of each of the leads 35 and 36 is connected by a conductive adhesive to a corresponding one of the terminals 37a and 37b, and the other end thereof extends in the space C to be in contact with the electrodes 241 and 242 of the battery through the projections 162 and 193.

The sheet 11 is adhered to the upper surface of the sheet 16, and the sheet 20 is adhered to the upper surface of the sheet 19. A movable contact 221C printed on the lower surface of the section 12 of the sheet 11 is elastically deformed when pressed by a finger, and the contact 221C is urged against the contact 221 and electrically connects contacts 221a and 221b, so that a key switch is turned on. When the finger is released, the contact 221C is removed from the contact 221 by the elastic force of the sheet 11, so that the key switch is turned off.

As shown in FIG. 1A, an embossed portion including a holder's code number 11A and a card holder's name 11B can be formed on the sheet 11, as needed. A solar cell or a combination of a solar cell and the paper battery can be used as a power source in place of the paper battery 24. In this case, as shown in FIG. 1B, a light-receiving surface of the cell 40 is located and exposed at a position near the window of display device 13 of the sheet 20.

The intelligent card of the embodiment of FIG. 1 can have the same thickness as that of the conventional credit card. More specifically, the chips 30 and 31, the device 23, and the battery 24 have a thickness of 0.5 mm, respectively, the sheets 11 and 16 have thicknesses of 0.07 mm and 0.05 mm, respectively, the spacer has a thickness of 0.03 mm, the frame 17 has a thickness of 0.4 mm, the sheets 18, 19 and 20 have thicknesses of 0.03 mm, 0.2 mm and 0.05 mm, and the recesses 191, 192, 194 and 195 of the sheet 19 have a depth of 0.1 mm. Therefore, the card 10 has an overall thickness of 0.8 mm.

The circuit arrangement of the intelligent card of FIG. 22 will be described with reference to the block diagram of FIG. 27. Referring to FIG. 27, the circuits arranged in the chips 30 and 31 are represented by dotted blocks 50 and 60, respectively. The block 50 provides a normal electronic calculator function. Key signals from the key switches constituted by the contacts 221a 221b and 221c of the section 12 are fetched by a CPU 52 through a key discrimination section 51. The key signals supplied to the CPU 52 comprise a key signal b from the CF key 12C and a key signal a from the keys 12A and 12B excluding the CF key. Various calculations are performed using an arithmetic circuit 53 and a memory section 54 in response to the signal a under the control of the CPU 52. The key input data and the calculation results are displayed on the device 23 through a display driving circuit 55.

The circuit block 60 of the chip 31 has a CPU 61, a memory section 62, an electronic erasable-programable ROM (EEP-ROM) 63, a decryption circuit 64 and a comparator 65. The EEP-ROM 63 stores an encrypted identification code for designating the authorized card holder.

Figure 24:
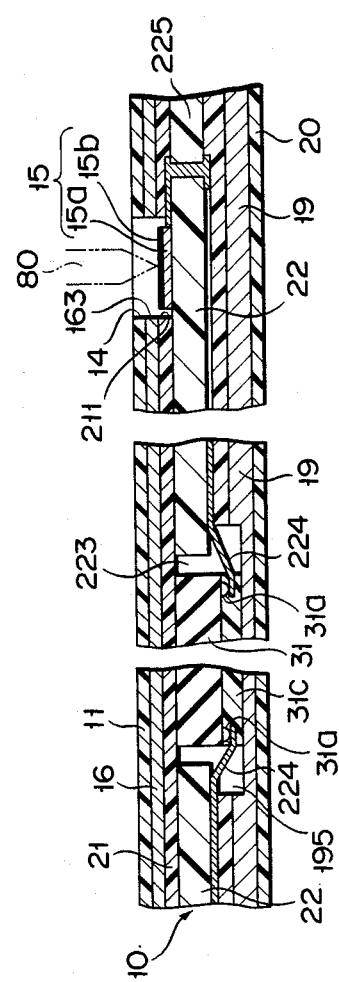

The CPU 61 is connected to the contacts 15. When the intelligent card 10 is inserted in a terminal 70 such as a cash dispenser, contact pins 80 of the terminal 70 are electrically connected with the contacts 15, as shown in FIG. 24. The eight contacts 15 comprise an address data input/output terminal, a clock terminal, a reset terminal, a power source VDD terminal, a GND terminal and an EEP-ROM write VCC terminal.

The intelligent card of this embodiment serves as an IC card for collating the identification number and as a compact electronic calculator for providing a calculation function. Unlike the IC card having only the identification function, the intelligent card can provide a value to be added. Since the identification and calculator functions are simultaneously used on a given occasion, the intelligent card can be conveniently used. Furthermore, the IC chips and metal contacts are supported by the insulating base fixed on the thin metal plate, so that the chips and contacts can be easily formed with high mechanical strength. In addition, the holding member of the metal contacts will not be substantially deformed by a pressure acting on the contact pins contacting the metal contacts, thereby guaranteeing stable electrical connections therebetween.

In the above description, two IC chips are used for calculation and identification, respectively. However, a single IC chip having both the calculation and identification functions can be used. In the above embodiment, the board 22 supports the contacts 221, the IC chips 30 and 31 and the metal contacts 15. However, the board can be properly divided, and the divided boards can be connected through flexible connectors. In addition, the board 22 need not be constituted by a single sheet. After an insulating material is coated on the sheet 19, a conductive pattern can be formed by printing or pattern transfer. In this case, the terminals of the chips 30 and 31 are connected to the conductive film of the tape carrier, and the conductive film is bonded to the conductive pattern, thereby achieving a chip-on-board scheme. The contacts 15 are inserted in the openings 14 of the sheet 11 (0.1 mm or less in the above embodiment). In order to allow easy removal of dust from the openings 14, a conductive metal film is coated to the same level as that of the upper surface of the sheet 11 or to extend upward therefrom. The contacts 15 are formed on the lower surface of the board 22, i.e., the surface of the board 22 which does not have the key switches. The power source battery comprises a paper-like battery in the above embodiment but can be replaced with a solar cell.

The intelligent card has the identification and compact calculator functions, so that the public consumers will appreciate that the intelligent card is a good buy. Since the IC chips and the metal contacts are mounted on the insulating base which is then mounted on a metal plate having larger flexibility than the insulating base, the IC chips and the metal contacts can be properly mounted with high mechanical strength protecting against an external impact and load, thus providing great practical advantages.

What is claimed is:

1. An intelligent card, comprising:
   input means including a keyboard for entering identification information;
   first memory means for storing the identification information entered by said input means;
   second memory means for storing predetermined identification information;
   means for performing a collation of the identification information stored in said first and said second memory means and for producing a corresponding collation result signal;
   means for outputting a signal representing a collation result generated from said collation performing means;
   means for storing time-related intelligent card validity data;
   means for comparing calendar data with the validity data;
   means for displaying a comparison result obtained by said data comparing means;
   power source means for supplying electric power to all of said means; and
   card sheet means for containing all of said means in the form of a card body.

2. A card according to claim 1, comprising:
   a thin flat card base forming a part of said card sheet means;
   said outputting means being arranged on said card base; and
   said power source means being arranged in said card base.

3. A card according to claim 2, wherein said outputting means includes a display device, and a surface of said display device extends upward from an upper surface of said card base.

4. A card according to claim 3, wherein said outputting means includes display control means for displaying input identification information on said display device, and means for clearing the input identification information displayed on said display device and for displaying a collation result corresponding to said result signal on said display device.

5. A card according to claim 3, further comprising means for detecting that a predetermined period of time has elapsed after the collation result of said collation performing means is displayed, and means for clearing a displayed content in response to an output from said detecting means.

6. A card according to claim 3, further comprising:
   second counting means for counting a number of digits of the identification information entered from said input means;
   discriminating means for discriminating whether or not the count of said second counting means has reached a number of digits corresponding to said identification information stored in said second memory means; and
   display inhibiting means for inhibiting display of said display device in accordance with a discrimination result of said discriminating means.

7. A card according to claim 1, wherein said second memory means includes an erasable and programmable nonvolatile memory circuit.

8. A card according to claim 7, wherein said second memory means includes a first memory area for storing the predetermined identification information and a second memory area for accumulating a number of times of noncoincidence between the identification information stored in said first and said second memory means when the identification information is compared by said collation performing means.

9. A card according to claim 8, wherein said collating performing means includes flag data outputting means for outputting card invalid flag data when the number of times of noncoincidence exceeds a predetermined value, and said second memory means has a third memory area for storing the card invalid flag data.

10. A card according to claim 2, wherein said collation performing means includes means for comparing the contents of said first and said second memory means.

11. A card according to claim 10, further comprising: first counting means for counting number of times of noncoincidence detected by said collation performing means; detecting means for detecting whether or not a count of said first counting means has reached a predetermined value; and means for invalidating said intelligent card when the count has reached the predetermined value.

12. A card according to claim 11, wherein said second memory means includes an erasable and programmable nonvolatile memory circuit, and the count of said first counting means is stored in said nonvolatile memory circuit.

13. A card according to claim 1, wherein said keyboard of said input means includes a plurality of alphanumeric keys for entering the identification information and an instruction key for instructing card identification, and said collation performing means includes means for comparing the contents of said first and said second memory means and for storing the input identification information in said first memory means when the input identification information is entered while said instruction key is in a depressed state.

14. A card according to claim 1, further comprising:
    reference clock signal generating means for generating a reference clock signal;
    means for outputting at least one of time data and calendar data by counting said reference clock signal; and
    means for displaying at least one of the time data and the calendar data.

15. A card according to claim 1, further comprising: means for calculating the number of remaining valid days up to an expiration date; and means for supplying a flickering display signal to said display means when the number of remaining valid days is less than a predetermined number.

16. A card according to claim 1, including coupling means for communicating said collation performing means with a device external to said card.

17. A card according to claim 16, wherein said coupling means is a connector for electrically connecting the external device with said collation performing means.

18. A card according to claim 16, wherein said coupling means includes a light-emitting element for emitting light to transmit data to said external device, and a photosensor for receiving data transmitted from said external device.

19. A card according to claim 1, wherein said power source means includes a solar cell.

20. A card according to claim 1, wherein said power source means comprises a solar cell and a secondary battery for accumulating an output from said solar cell.

21. An intelligent card containing at least an integrated circuit chip, comprising:
key input means having a plurality of keys for entering identification information and a first collation key for instructing card identification;
first memory means for storing the input identification information entered at said key input means;
second memory means for storing predetermined identification information;
comparing means for comparing contents of said first and said second memory means;
detecting means for detecting whether or not said first collation key is depressed; and
control means coupled to said key input means, said comparing means, and said detecting means, for writing the identification information entered from said key input means in said first memory means when said detecting means detects that said first collation key is depressed, and for causing said comparing means to compare the contents of said first and said second memory means when said detecting means detects that said first collation key is released,
wherein said control means and said first and said second memory means are in the form of at least one integrated circuit chip.

22. A card according to claim 21, further comprising counting means for counting a number of digits of identification information entered at said key input means, discriminating means for discriminating whether or not the count of said counting means has reached a predetermined value, and said control means includes means for invalidating an input identification information at a time when said discriminating means discriminates that the count has not reached the predetermined value and said first collation key is released.

23. An intelligent card containing at least an integrated circuit chip, comprising:
key input means having a plurality of keys for entering identification information and first and second collation keys associated with card identification;
first memory means for storing the input identification information entered at said key input means;
second memory means for storing predetermined identification information;
comparing means for comparing contents of said first and said second memory means;
detecting means for detecting whether or not each of said first and said second collation keys is depressed; and
control means coupled to said key input means, said comparing means, and said detecting means, for writing the input identification information entered at said key input means in said first memory means when said detecting means detects that only said first collation key is depressed, and for causing said comparing means to compare the contents of said first and said second memory means when said detecting means detects that said first collation key is released and said second collation key is depressed,
wherein said control means and said first and said second memory means are in the form of at least one integrated circuit chip.

* * * * *